US012636679B2

(12) United States Patent
Pittet et al.

(10) Patent No.: US 12,636,679 B2
(45) Date of Patent: May 26, 2026

(54) METHODS FOR PRODUCING OPTICAL EFFECT LAYERS COMPRISING MAGNETIC OR MAGNETIZABLE PIGMENT PARTICLES

(71) Applicant: SICPA HOLDING SA, Prilly (CH)

(72) Inventors: Hervé Pittet, Châtel-St-Denis (CH); Thibaut Martini, Nyon (CH); Patrick Veya, Aclens (CH); Riccardo Ruggerone, Echallens (CH); Jean Garnier, Corcelles-le-Jorat (CH)

(73) Assignee: SICPA HOLDING SA, Prilly (CH)

( * ) Notice: Subject to any disclaimer, the term of this patent is extended or adjusted under 35 U.S.C. 154(b) by 202 days.

(21) Appl. No.: 18/012,538

(22) PCT Filed: Mar. 25, 2021

(86) PCT No.: PCT/EP2021/057718
§ 371 (c)(1),
(2) Date: Dec. 22, 2022

(87) PCT Pub. No.: WO2021/259527
PCT Pub. Date: Dec. 30, 2021

(65) Prior Publication Data

US 2023/0364639 A1 Nov. 16, 2023

(30) Foreign Application Priority Data

Jun. 23, 2020 (EP) .................................... 20181614

(51) Int. Cl.
*B05D 3/00* (2006.01)
*B05D 5/06* (2006.01)

(52) U.S. Cl.
CPC ............. *B05D 3/207* (2013.01); *B05D 5/067* (2013.01)

(58) Field of Classification Search
CPC ................................ B05D 3/207; B05D 5/067
See application file for complete search history.

(56) References Cited

U.S. PATENT DOCUMENTS 2,418,479 A 4/1947 Pratt et al.
2,570,856 A 10/1951 Pratt et al.
(Continued)

FOREIGN PATENT DOCUMENTS

CN 101011916 8/2007
CN 102529326 8/2014
(Continued)

OTHER PUBLICATIONS

Notification of Chinese Office Action in counterpart China Patent Application No. 202180044811.X dated Jul. 15, 2023 (and English language translation of Office Action).
(Continued)

*Primary Examiner* — Dah-Wei D. Yuan
*Assistant Examiner* — Kristen A Dagenais
(74) *Attorney, Agent, or Firm* — MUNCY, GEISSLER, OLDS & LOWE, P.C.

(57) ABSTRACT

The invention relates to the field of the protection of security documents such as for example banknotes and identity documents against counterfeit and illegal reproduction. In particular, the present invention provides methods for producing optical effect layers (OELs) exhibiting one or more indicia (x30) on a substrate (x20), said method comprising a step of exposing a coating layer (x10) comprising non-spherical magnetic or magnetisable pigment particles to a magnetic field of a magnetic-field generating device so as to orient at least a part of the magnetic or magnetisable pigment particles; a step of applying a top coating composition on top of the coating layer (x10) and in the form of one or more indicia (x30), and a step of at least partially curing the coating layer (x10) and the one or more indicia (x30) with a curing unit (x50).

16 Claims, 15 Drawing Sheets

(56) References Cited

U.S. PATENT DOCUMENTS

| | | | |
|---|---|---|---|
| 3,676,273 A | 7/1972 | Graves | |
| 3,791,864 A | 2/1974 | Steingroever | |
| 4,838,648 A | 6/1989 | Phillips et al. | |
| 5,364,689 A | 11/1994 | Kashiwagi et al. | |
| 5,630,877 A | 5/1997 | Kashiwagi et al. | |
| 6,103,361 A | 8/2000 | Batzar et al. | |
| 6,410,130 B1 * | 6/2002 | Schuhmacher ........ | C09K 19/38 428/407 |
| 6,531,221 B1 | 3/2003 | Schuhmacher et al. | |
| 6,582,781 B1 | 6/2003 | Schuhmacher et al. | |
| 6,838,166 B2 | 1/2005 | Phillips et al. | |
| 8,025,952 B2 | 9/2011 | Raksha et al. | |
| 8,343,615 B2 | 1/2013 | Raksha et al. | |
| 10,359,730 B2 | 7/2019 | Anno et al. | |
| 10,503,091 B2 | 12/2019 | Tsurumi et al. | |
| 2002/0160194 A1 | 10/2002 | Phillips et al. | |
| 2004/0009308 A1 | 1/2004 | Schlaf et al. | |
| 2005/0106367 A1 | 5/2005 | Raksha et al. | |
| 2006/0194040 A1 | 8/2006 | Raksha et al. | |
| 2007/0058227 A1 | 3/2007 | Raksha et al. | |
| 2007/0172261 A1 | 7/2007 | Raksha et al. | |
| 2008/0171144 A1 | 7/2008 | Raksha et al. | |
| 2013/0084411 A1 | 4/2013 | Raksha et al. | |
| 2015/0258837 A1 | 9/2015 | Ritter et al. | |
| 2017/0253070 A1 | 9/2017 | Loginov et al. | |
| 2017/0305184 A1 * | 10/2017 | Muller .................. | B05D 5/065 |
| 2018/0111406 A1 * | 4/2018 | Loginov ................ | H01F 41/16 |
| 2018/0170094 A1 * | 6/2018 | Raksha ............... | B42D 25/369 |

FOREIGN PATENT DOCUMENTS

| | | |
|---|---|---|
| CN | 108202542 | 6/2018 |
| DE | 2006848 | 9/1971 |
| DE | 102013015277 | 3/2015 |
| DE | 102018127936 | 5/2020 |
| EP | 0406667 | 1/1995 |
| EP | 0710508 | 5/1996 |
| EP | 0686675 | 2/1998 |
| EP | 1710756 | 10/2006 |
| EP | 1641624 | 4/2008 |
| EP | 1937415 | 4/2009 |
| EP | 2157141 | 2/2010 |
| EP | 1819525 | 3/2010 |
| EP | 2263806 | 12/2010 |
| EP | 2263807 | 12/2010 |
| EP | 2306222 | 4/2011 |
| EP | 2325677 | 5/2011 |
| EP | 2468423 | 6/2012 |
| EP | 2484455 | 8/2012 |
| EP | 2223976 | 9/2012 |
| EP | 1674282 | 6/2013 |
| EP | 2402401 | 11/2013 |
| EP | 2155498 | 3/2014 |
| EP | 3178569 | 6/2017 |
| EP | 3224055 | 8/2018 |
| EP | 3459758 | 3/2019 |
| EP | 2542421 | 5/2019 |
| EP | 3170566 | 10/2019 |
| EP | 3587500 | 1/2020 |
| WO | 02009002 | 1/2002 |
| WO | 02073250 | 9/2002 |
| WO | 02090002 | 11/2002 |
| WO | 03000801 | 1/2003 |
| WO | 2004007095 | 1/2004 |
| WO | 2005002866 | 1/2005 |
| WO | 2006061301 | 6/2006 |
| WO | 2006063926 | 6/2006 |
| WO | 2007131833 | 11/2007 |
| WO | 2008046702 | 4/2008 |
| WO | 2010058026 | 5/2010 |
| WO | 2011012520 | 2/2011 |
| WO | 2011092502 | 8/2011 |
| WO | 2012104098 | 8/2012 |
| WO | 2013167425 | 11/2013 |
| WO | 2014108303 | 7/2014 |
| WO | 2014108404 | 7/2014 |
| WO | 2014198905 | 12/2014 |
| WO | 2015082344 | 6/2015 |
| WO | 2015086257 | 6/2015 |
| WO | 2015121028 | 8/2015 |
| WO | 2016015973 | 2/2016 |
| WO | 2016026896 | 2/2016 |
| WO | 2016193252 | 12/2016 |
| WO | 2017021504 | 2/2017 |
| WO | 2017064052 | 4/2017 |
| WO | 2017080698 | 5/2017 |
| WO | 2017148789 | 9/2017 |
| WO | 2018019594 | 2/2018 |
| WO | 2018054819 | 3/2018 |
| WO | 2018141547 | 8/2018 |
| WO | 2019103937 | 5/2019 |
| WO | 2019215148 | 11/2019 |
| WO | 2020006286 | 1/2020 |
| WO | 2020052862 | 3/2020 |
| WO | 2020094291 | 5/2020 |
| WO | 2020148076 | 7/2020 |
| WO | 2020160993 | 8/2020 |
| WO | 2020193009 | 10/2020 |

OTHER PUBLICATIONS

Z.Q. Zhu and D. Howe, "Halbach permanent magnet machines and applications: a review", IEE. Proc. Electric Power Appl., 2001, 148, p. 299-308).

F. C. Krebs, Solar Energy Materials & Solar Cells (2009), 93, p. 405-406.

F. C. Krebs, Solar Energy Materials & Solar Cells (2009), 93, p. 407.

N. J. Wilkinson et al., "A review of aerosol jet printing-a non-traditional hybrid process for micro-manufacturing" The International Journal of Advanced Manufacturing Technology (2019) 105:pp. 4599-4619.

P.V. Raje and N.C. Murmu, "A review on Eletrohydrodynamic-inkjet printing technology" International Journal of Emerging Technology and Advanced Engineering, (2014), 4(5), pp. 174-183.

Extended European Search Report issued with respect to application No. 20181614.7.

Bangladesh Examination Report issued with respect to Bangladesh application No. 101/2021.

International Search Report and Written Opinion issued with respect to application No. PCT/EP2021/057718.

* cited by examiner

METHODS FOR PRODUCING OPTICAL EFFECT LAYERS COMPRISING MAGNETIC OR MAGNETIZABLE PIGMENT PARTICLES

FIELD OF THE INVENTION

The present invention relates to the field of magnetic-field generating devices and methods for producing optical effect layers (OELs) comprising magnetically oriented platelet-shaped magnetic or magnetizable pigment particles. In particular, the present invention provides magnetic-field generating devices and method for magnetically orienting platelet-shaped magnetic or magnetizable pigment particles in coating layer so as to produce OELs and the use of said OELs as anti-counterfeit means on security documents or security articles as well as decorative purposes.

BACKGROUND OF THE INVENTION

It is known in the art to use inks, compositions, coatings or layers containing oriented magnetic or magnetizable pigment particles, particularly also optically variable magnetic or magnetizable pigment particles, for the production of security elements, e.g. in the field of security documents. Coatings or layers comprising oriented magnetic or magnetizable pigment particles are disclosed for example in U.S. Pat. Nos. 2,570,856; 3,676,273; 3,791,864; 5,630,877 and 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Security features, e.g. for security documents, can generally be classified into "covert" security features on the one hand, and "overt" security features on the other hand. The protection provided by covert security features relies on the principle that such features are difficult to detect, typically requiring specialized equipment and knowledge for detection, whereas "overt" security features rely on the concept of being easily detectable with the unaided human senses, e.g. such features may be visible and/or detectable via the tactile sense while still being difficult to produce and/or to copy. However, the effectiveness of overt security features depends to a great extent on their easy recognition as a security feature.

Magnetic or magnetizable pigment particles in printing inks or coatings allow for the production of magnetically induced images, designs and/or patterns through the application of a correspondingly structured magnetic field, inducing a local orientation of the magnetic or magnetizable pigment particles in the not yet hardened (i.e. wet) coating, followed by the hardening of the coating. The result is a fixed and stable magnetically induced image, design or pattern. Materials and technologies for the orientation of magnetic or magnetizable pigment particles in coating compositions have been disclosed for example in U.S. Pat. Nos. 2,418,479; 2,570,856; 3,791,864, DE 2006848-A, U.S. Pat. Nos. 3,676,273, 5,364,689, 6,103,361, EP 0 406 667 B1; US 2002/0160194; US 2004/0009308; EP 0 710 508 A1; WO 2002/09002 A2; WO 2003/000801 A2; WO 2005/002866 A1; WO 2006/061301 A1. In such a way, magnetically induced patterns which are highly resistant to counterfeit can be produced. The security element in question can only be produced by having access to both, the magnetic or magnetizable pigment particles or the corresponding ink, and the particular technology employed to print said ink and to orient said pigment in the printed ink.

With the aim of protecting security documents or articles comprising a magnetically induced image against the premature detrimental influence of soil and/or moisture upon use and time, it has been a practice to apply a protective varnish. Said protective varnishes are applied as continuous layers on top of the already prepared and dried/cured magnetically induced image.

WO 2011/012520 A2 discloses a transfer foil comprising a coating layer having the form of a design, said design comprising oriented optically variable magnetic pigment representing an image, indicium, or a pattern. The transfer foil may further comprise a top coating layer, wherein said top coating layer is applied prior to the application of the layer comprising the optically variable magnetic pigment. The process to produce said transfer foil comprises a) a step of applying the top coating layer, hardening/curing said top coating layer, and b) applying the layer comprising the optically variable magnetic pigments, magnetically orienting the particles and hardening/curing said layer. The disclosed methods are not suitable for producing magnetically induced images required to exhibit personalized variable indicia.

EP 1 641 624 B1, EP 1 937 415 B1 and EP 2 155 498 B1 disclose devices and method for magnetically transferring indicia into a not yet hardened (i.e. wet) coating composition comprising magnetic or magnetizable pigment particles so as to form optical effect layers (OELs). The disclosed methods allow the production of security documents and articles having a customer-specific magnetic design. However, the disclosed magnetic devices are prepared to meet the specific design and cannot be modified if said design is required to change from one article to another one and thus, the methods are not suitable for producing OEL required to exhibit personalized variable indicia.

EP 3 170 566 B1 and EP 3 459 758 A1, EP 2 542 421 B1 disclose different methods for the production of variable indicia on optically variable magnetic ink. However, said methods require the use of special apparatus such as photomask or laser.

With the aim of producing variable information having magnetic properties on security documents or articles, inkjet inks comprising magnetic particles have been developed to allow Magnetic Ink Character Recognition (MICR). However, said inkjet inks face different challenges in particular related to the shelf-life stability of said inks, ink printability, non-homogeneous magnetic inks deposits and printhead clogging. EP 2 223 976 B1 discloses a method for the production of documents comprising a MICR feature, wherein said method comprises a step of applying by inkjet a pattern of a curable ink containing a gellant on a substrate, cooling the ink below the gel temperature of the ink, applying a magnetic material to the ink and finally curing said ink. Alternatively, toner comprising magnetic particles have also been developed and are disclosed for example in U.S. Pat. No. 10,503,091 B2 and U.S. Pat. No. 10,359,730 B2. However specific dedicated apparatus are required to print those toners.

Therefore, a need remains for methods to produce customized optical effect layers exhibiting one or more indicia in a versatile manner but also on an industrial scale, said optical effects layers exhibiting an eye-catching effect. Furthermore, said methods should be reliable, easy to implement and able to work at a high production speed.

SUMMARY OF THE INVENTION

Accordingly, it is an object of the present invention to overcome the deficiencies of the prior art. This is achieved by the provision of a method for producing an optical effect layer (OEL) exhibiting one or more indicia (x30) on a substrate (x20) comprising the steps of:

a) applying on a substrate (x20) surface a radiation curable coating composition comprising non-spherical magnetic or magnetisable pigment particles, said radiation curable coating composition being in a first, liquid state so as to form a coating layer (x10);

b) exposing the coating layer (x10) to a magnetic field of a magnetic-field generating device so as to orient at least a part of the magnetic or magnetisable pigment particles;

c) subsequently to step b), applying a top coating composition on top of the coating layer (x10), wherein said top coating composition is applied in the form of one or more indicia (x30), and d) partially simultaneously with or subsequently to step c), at least partially curing the coating layer (x10) and the one or more indicia (x30) with a curing unit (x50).

In one preferred embodiment, the step b) of exposing the coating layer (x10) is carried out so as to mono-axially orient at least a part of the magnetic or magnetisable pigment particles. In another preferred embodiment, the step b) of exposing the coating layer (x10) is carried out so as to bi-axially orient at least a part of the magnetic or magnetisable pigment particles.

In one preferred embodiment, the step a) of applying the radiation curable coating composition is carried out by a process selected from the group consisting of screen printing, rotogravure printing, pad printing and flexography printing.

In one preferred embodiment, the step c) of applying the top coating composition is carried out by a contactless fluid microdispensing technologies, preferably by an inkjet printing process.

Also described herein are optical effect layers (OELs) produced by the method described herein and security documents as well as decorative elements and objects comprising one or more optical OELs described herein.

Also described herein are methods of manufacturing a security document or a decorative element or object, comprising a) providing a security document or a decorative element or object, and b) providing an optical effect layer such as those described herein, in particular such as those obtained by the method described herein, so that it is comprised by the security document or decorative element or object.

The method described herein advantageously uses two compositions, wherein said two compositions are applied on each other in a wet-on-wet state. In particular, the method according to the invention allows the production of optical effect layers (OELs) exhibiting one or more indicia in a versatile manner, can be easily implemented on an industrial scale at a high production speed. The two compositions used in the method described herein comprise as a first composition, a radiation curable coating composition comprising non-spherical magnetic or magnetisable pigment particles which is applied on the substrate (x20) and a top coating composition as second composition which is applied on top of the radiation curable coating composition comprising the pigment particles and partially overlaps (i.e. overlaps in at least one area) said composition and which is applied in the form of the one or more indicia, when said radiation curable coating composition is still in a wet, unpolymerized state.

The present invention provides a reliable and easy-to-implement method for producing eye-catching optical effect layers (OELs) exhibiting the one or more indicia described herein. The disclosed methods advantageously allow the production of security documents and articles having a customer-specific magnetic design also exhibiting one or more indicia in a versatile, on-line variation, easy-to-implement and highly reliable way without requiring the customization of the magnetic assemblies used to orient the non-spherical magnetic or magnetizable pigment particles for each variable or personalized indicium and for each and every customer-specific optical effect layers (OELs). The present invention also provides a reliable and easy way to implement methods for producing eye-catching optical effect layers (OELs) exhibiting the one or more indicia described herein comprising variable halftones.

BRIEF DESCRIPTION OF DRAWINGS

The methods described herein for producing optical effect layers (OELs) exhibiting one or more indicia (x30) on the substrate (x20) described herein are now described in more details with reference to the drawings and to particular embodiments, wherein FIG. 1 schematically illustrates a platelet-shaped pigment particle.

FIG. 2D-2 schematically illustrates a method for producing an optical effect layer (OEL) exhibiting one or more indicia (230) on a substrate (220) according to the present invention. The method comprise a step b) of exposing the coating layer (210) to the magnetic field of the magnetic-field generating device (B1) so as to bi-axially orient at least a part of the magnetic or magnetisable pigment particles; subsequently to step b) the step c) of applying the top coating composition on top of the coating layer (210), wherein said top coating composition is applied in the form of one or more indicia (230); partially simultaneously with or subsequently to step c), the step x) of selectively at least partially curing with a selective curing unit (260) one or more first areas of the coating layer (210) to fix at least a part of the magnetic or magnetisable particles in their adopted positions and orientations, and optionally of the top coating (230), such that one or more second areas of the coating layer (210) and optionally of the top coating (230) remain unexposed to irradiation; subsequently to step x), the step y) of exposing the coating layer (210) to the magnetic field of the second magnetic-field-generating device (B2) so as to mono-axially orient at least a part of the magnetic or magnetisable pigment particles of the one or more second areas of the coating layer (210); and a step d) of at least partially curing the coating layer (210) and the one or more indicia (230) with a curing unit (250).

FIG. 2D-3 schematically illustrates a method for producing an optical effect layer (OEL) exhibiting one or more indicia (230) on a substrate (220) according to the present invention. The method comprise a step b1) of exposing the coating layer (210) to the magnetic field of the magnetic-field generating device (B1) so as to bi-axially orient at least a part of the magnetic or magnetisable pigment particles; subsequently to step b1), the step b2) of exposing the coating layer (210) to the magnetic field of the second magnetic-field-generating device (B2) so as to mono-axially re-orient at least a part of the platelet-shaped magnetic or magnetisable particles; subsequently to step b2) the step c) of applying the top coating composition on top of the coating layer (210), wherein said top coating composition is applied in the form of one or more indicia (230); partially simultaneously with or subsequently to step c), the step x) of selectively at least partially curing with a selective curing unit (260) one or more first areas of the coating layer (210) to fix at least a part of the magnetic or magnetisable particles in their adopted positions and orientations, and optionally of the top coating (230), such that one or more second areas of the coating layer (210) and, optionally, of the top coating (230) remain unexposed to irradiation; subsequently to step x), the step y) of exposing the coating layer (210) to the magnetic field of the third magnetic-field-generating device (B3) so as to mono-axially re-orient at least a part of the magnetic or magnetisable pigment particles of the one or more second areas of the coating layer (210); and a step d) of at least partially curing the coating layer (210) and the one or more indicia (230) with a curing unit (250).

FIG. 2E-1 schematically illustrates a method for producing an optical effect layer (OEL) exhibiting one or more indicia (230) on a substrate (220) according to the present invention. The method comprises a step b) of exposing the coating layer (210) to the magnetic field of the magnetic-field generating device (B1) so as to mono-axially orient at least a part of the magnetic or magnetisable pigment particles; partially simultaneously with or subsequently to step b), the step x) of selectively at least partially curing with a selective curing unit (260) one or more first areas of the coating layer (210) to fix at least a part of the magnetic or magnetisable particles in their adopted positions and orientations, and optionally of the top coating (230), such that one or more second areas of the coating layer (210) and optionally of the top coating (230) remain unexposed to irradiation; subsequently to step x), the step y) of exposing the coating layer (210) to the magnetic field of the second magnetic-field-generating device (B2) so as to mono-axially re-orient at least a part of the magnetic or magnetisable pigment particles of the one or more second areas of the coating layer (210); subsequently to step y), the step c) of applying the top coating composition on top of the coating layer (210), wherein said top coating composition is applied in the form of one or more indicia (230); and a step d) of at least partially curing the coating layer (210) and the one or more indicia (230) with a curing unit (250).

FIG. 2E-2 schematically illustrates a method for producing an optical effect layer (OEL) exhibiting one or more indicia (230) on a substrate (220) according to the present invention. The method comprises a step b) of exposing the coating layer (210) to the magnetic field of the magnetic-field generating device (B1) so as to bi-axially orient at least a part of the magnetic or magnetisable pigment particles; partially simultaneously with or subsequently to step b), the step x) of selectively at least partially curing with a selective curing unit (260) one or more first areas of the coating layer (210) of the radiation curable coating composition of step b) so as to fix at least a part of the magnetic or magnetisable particles in their adopted positions and orientations, and optionally of the top coating (230), such that one or more second areas of the coating layer (210) and optionally of the top coating (230) remain unexposed to irradiation; subsequently to step x), the step y) of exposing the coating layer (210) to the magnetic field of the second magnetic-field-generating device (B2) so as to mono-axially orient at least a part of the magnetic or magnetisable pigment particles of the one or more second areas of the coating layer (210); subsequently to step y), the step c) of applying the top coating composition on top of the coating layer (210), wherein said top coating composition is applied in the form of one or more indicia (230); and a step d) of at least partially curing the coating layer (210) and the one or more indicia (230) with a curing unit (250).

FIG. 2E-3 schematically illustrates a method for producing an optical effect layer (OEL) exhibiting one or more indicia (230) on a substrate (220) according to the present invention. The method comprises a step b1) of exposing the coating layer (210) to the magnetic field of the magnetic-field generating device (B1) so as to bi-axially orient at least a part of the magnetic or magnetisable pigment particles; simultaneously with, partially simultaneously with or subsequently to step b1), the step b2) of exposing the coating layer (210) to the magnetic field of the second magnetic-field-generating device (B2) so as to mono-axially orient at least a part of the platelet-shaped magnetic or magnetisable particles; partially simultaneously with or subsequently to step b2), the step x) of selectively at least partially curing with a selective curing unit (260) one or more first areas of the coating layer (210) of the radiation curable coating composition of step b) so as to fix at least a part of the magnetic or magnetisable particles in their adopted positions and orientations, and optionally of the top coating (230), such that one or more second areas of the coating layer (210) and optionally of the top coating (230) remain unexposed to irradiation; subsequently to step x), the step y) of exposing the coating layer (210) to the magnetic field of the third magnetic-field-generating device (B3) so as to mono-axially orient at least a part of the magnetic or magnetisable pigment particles of the one or more second areas of the coating layer (210); subsequently to step y), the step c) of applying the top coating composition on top of the coating layer (210), wherein said top coating composition is applied in the form of one or more indicia (230); and a step d) of at least partially curing the coating layer (210) and the one or more indicia (230) with a curing unit (250).

FIG. 3 schematically illustrates a magnetic-field generating device to bi-axially orient magnetic or magnetisable pigment particles in a coating layer (310) on a substrate (320).

DETAILED DESCRIPTION

Definitions

Figure 1:
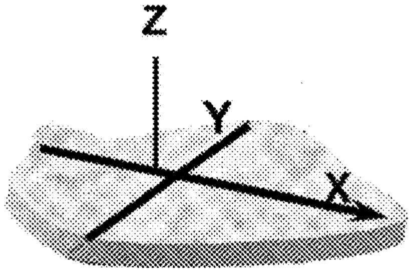
FIG. 2D-1 schematically illustrates a method for producing an optical effect layer (OEL) exhibiting one or more indicia (230) on a substrate (220) according to the present invention. The method comprises a step b) of exposing the coating layer (210) to the magnetic field of the magnetic-field generating device (B1) so as to mono-axially orient at least a part of the magnetic or magnetisable pigment particles; subsequently to step b), the step c) of applying the top coating composition on top of the coating layer (210), wherein said top coating composition is applied in the form of one or more indicia (230); partially simultaneously with or subsequently to step c), the step x) of selectively at least partially curing with a selective curing unit (260) one or more first areas of the coating layer (210) to fix at least a part of the magnetic or magnetisable particles in their adopted positions and orientations, and optionally of the top coating (230), such that one or more second areas of the coating layer (210) and optionally of the top coating (230) remain unexposed to irradiation; subsequently to step x), the step y) of exposing the coating layer (210) to the magnetic field of the second magnetic-field-generating device (B2) so as to mono-axially orient at least a part of the magnetic or magnetisable pigment particles of the one or more second areas of the coating layer (210); and a step d) of at least partially curing the coating layer (210) and the one or more indicia (230) with a curing unit (250).

The following definitions are to be used to interpret the meaning of the terms discussed in the description and recited in the claims.

As used herein, the term “at least one” is meant to define one or more than one, for example one or two or three.

As used herein, the terms “about” and “substantially” mean that the amount or value in question may be the specific value designated or some other value in its neighborhood. Generally, the terms “about” and “substantially” denoting a certain value is intended to denote a range within ±5% of the value. As one example, the phrase “about 100” denotes a range of 100±5, i.e. the range from 95 to 105. Generally, when the terms “about” and “substantially” are used, it can be expected that similar results or effects according to the invention can be obtained within a range of ±5% of the indicated value.

The terms “substantially parallel” refer to deviating not more than 10° from parallel alignment and the terms “substantially perpendicular” refer to deviating not more than 10° from perpendicular alignment.

As used herein, the term “and/or” means that either all or only one of the elements of said group may be present. For example, “A and/or B” shall mean “only A, or only B, or both A and B”. In the case of “only A”, the term also covers the possibility that B is absent, i.e. “only A, but not B”.

The term “comprising” as used herein is intended to be non-exclusive and open-ended. Thus, for instance a coating composition comprising a compound A may include other compounds besides A. However, the term “comprising” also covers, as a particular embodiment thereof, the more restrictive meanings of “consisting essentially of” and “consisting of”, so that for instance “a fountain solution comprising A, B and optionally C” may also (essentially) consist of A and B, or (essentially) consist of A, B and C.

The term “optical effect layer (OEL)” as used herein denotes a coating layer that comprises oriented magnetic or magnetizable pigment particles, wherein said magnetic or magnetizable pigment particles are oriented by a magnetic field and wherein the oriented magnetic or magnetizable pigment particles are fixed/frozen in their orientation and position (i.e. after curing) so as to form a magnetically induced image.

The term “coating composition” refers to any composition which is capable of forming an optical effect layer (OEL) on a solid substrate and which can be applied preferably but not exclusively by a printing method. The coating composition comprises the platelet-shaped magnetic or magnetizable pigment particles described herein and the binder described herein.

As used herein, the term “wet” refers to a coating layer which is not yet cured, for example a coating in which the platelet-shaped magnetic or magnetizable pigment particles are still able to change their positions and orientations under the influence of external forces acting upon them.

The term “security document” refers to a document which is usually protected against counterfeit or fraud by at least one security feature. Examples of security documents include without limitation value documents and value commercial goods.

The term “security feature” is used to denote an image, pattern or graphic element that can be used for authentication purposes.

Where the present description refers to “preferred” embodiments/features, combinations of these “preferred” embodiments/features shall also be deemed as disclosed as long as this combination of “preferred” embodiments/features is technically meaningful.

The present invention provides methods for producing optical effect layers (OELs) exhibiting one or more indicia (x30) on substrates (x20), wherein said OELs are based on magnetically oriented platelet-shaped magnetic or magnetizable pigment particles and further exhibit one or more indicia (x30).

The method described herein comprises the step a) of applying on the substrate (x20) surface described herein the radiation curable coating composition comprising the non-spherical magnetic or magnetizable pigment particles described herein so as to form the coating layer (x10) described herein, said composition being in a first liquid state which allows its application as a layer and which is in a not yet cured (i.e. wet) state wherein the pigment particles can move and rotate within the layer. Since the radiation curable coating composition described herein is to be provided on the substrate (x20) surface, the radiation curable coating composition comprises at least a binder material and the magnetic or magnetizable pigment particles, wherein said composition is in a form that allows its processing on the desired printing or coating equipment. Preferably, said step a) is carried out by a printing process, preferably selected from the group consisting of screen printing, rotogravure printing, flexography printing, intaglio printing (also referred in the art as engraved copper plate printing, engraved steel die printing), pad printing and curtain coating, more preferably selected from the group consisting of intaglio printing, screen printing, rotogravure printing, pad printing and flexography printing and still more preferably screen printing, rotogravure printing, pad printing and flexography printing.

The non-spherical magnetic or magnetizable pigment particles described herein are preferably prolate or oblate ellipsoid-shaped, platelet-shaped or needle-shaped magnetic or magnetizable pigment particles or a mixture of two or more thereof and more preferably platelet-shaped particles.

Non-spherical magnetic or magnetizable pigment particles described herein are defined as having, due to their non-spherical shape, non-isotropic reflectivity with respect to an incident electromagnetic radiation for which the cured binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the non-spherical magnetic or magnetizable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. As known by the man skilled in the art, the magnetic or magnetizable pigment particles described herein are different from conventional pigments, in that said conventional pigment particles exhibit the same color and reflectivity, independent of the particle orientation, whereas the magnetic or magnetizable pigment particles described herein exhibit either a reflection or a color, or both, that depend on the particle orientation.

For embodiments of the method described herein wherein the step b) or b1) of exposing the coating layer (x10) to the magnetic field of the magnetic-field generating device described herein is carried out so as to bi-axially orient at least a part of the magnetic or magnetisable pigment particles, at least a part of the non-spherical magnetic or magnetizable pigment particles described herein is required to consist of platelet-shaped magnetic or magnetisable pigment particles having an X-axis and a Y-axis defining a plane of predominant extension of the particles. In contrast to needle-shaped pigment particles which can be considered as one-dimensional particles, platelet-shaped pigment particles have an X-axis and a Y-axis defining a plane of predominant extension of the particles. In other words, platelet-shaped pigment particles may be considered to be two-dimensional particles due to the large aspect ratio of their dimensions as can be seen in FIG. 1. As shown in FIG. 1, a platelet-shaped pigment particle can be considered as a two-dimensional structure wherein the dimensions X and Y are substantially larger than dimension Z. Platelet-shaped pigment particles are also referred in the art as oblate particles or flakes. Such pigment particles may be described with a main axis X corresponding to the longest dimension crossing the pigment particle and a second axis Y perpendicular to X which also lies within said pigment particles.

The method described herein comprises the step b) of exposing the coating layer (x10) to the magnetic field of the magnetic-field generating device described herein so as to orient at least a part of the magnetic or magnetisable pigment particles. According to one embodiment, the step b) is carried out to so as to mono-axially orient at least a part of the magnetic or magnetisable pigment particles described herein. According to another embodiment, the step b) is carried out so as to bi-axially orient at least a part of the platelet-shaped magnetic or magnetisable pigment particles, preferably so as to bi-axially orient at least a part of the platelet-shaped magnetic or magnetisable pigment particles to have both their X-axes and Y-axes substantially parallel to the substrate surface. For embodiments wherein the method described herein comprises the step of exposing the coating layer (x10) to the magnetic field of the magnetic-field generating device described herein so as to bi-axially orient at least a part of the magnetic or magnetisable pigment particle, the coating layer (x10) may be exposed more than one time to said magnetic-field generating device.

During the magnetic orientation (step b)) described herein of the magnetic or magnetisable pigment particles, the substrate (x20) carrying the coating layer (x10) may be disposed on a non-magnetic supporting plate (x40) which is made of one or more non-magnetic materials.

Figure 2A:
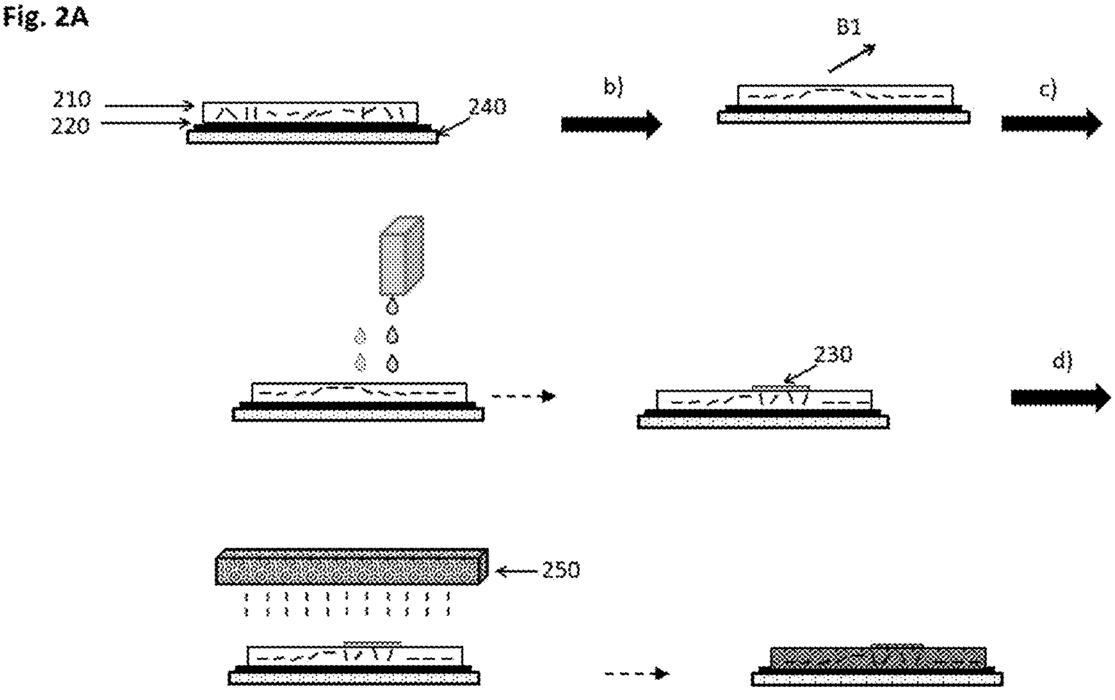
FIG. 2A schematically illustrates a method for producing an optical effect layer (OEL) exhibiting one or more indicia (230) on a substrate (220) according to the present invention. The method comprises the step b) of exposing the coating layer (210) to the magnetic field of the magnetic-field generating device (B1) so as to mono-axially orient at least a part of the magnetic or magnetisable pigment particles; subsequently to step b), the step c) of applying the top coating composition on top of the coating layer (210), wherein said top coating composition is applied in the form of one or more indicia (230); and the step d) of at least partially curing the coating layer (210) and the one or more indicia (230) with a curing unit (250).

During the magnetic orientation (step b)) described herein of the magnetic or magnetisable pigment particles, the position of the magnetic-field-generating devices is not limited and depends on the choice and the design of the magnetic orientation pattern to be produced. Therefore, the position of the magnetic-field-generating devices (B1, B2, B3) in FIGS. 2 and 4 is only for illustrative purpose and is not limited. Depending on the choice and the design of the magnetic orientation pattern to be produced, the magnetic-field-generating devices (B1, B2, B3) in FIGS. 2 and 4 may be placed below the substrate (x20) or on top of the coating layer (x10).

In contrast to a mono-axial orientation wherein magnetic or magnetizable pigment particles are orientated in such a way that only their main axis is constrained by the magnetic field, carrying out a bi-axial orientation means that the platelet-shaped magnetic or magnetisable pigment particles are made to orientate in such a way that their two main axes are constrained. That is, each platelet-shaped magnetic or magnetisable pigment particle can be considered to have a major axis in the plane of the pigment particle and an orthogonal minor axis in the plane of the pigment particle. The major and minor axes of the platelet-shaped magnetic or magnetisable pigment particles are each caused to orient according to the magnetic field. Effectively, this results in neighboring platelet-shaped magnetic pigment particles that are close to each other in space to be essentially parallel to each other. Put another way, bi-axial orientation aligns the planes of the platelet-shaped magnetic or magnetisable pigment particles so that the planes of said pigment particles are oriented to be essentially parallel relative to the planes of neighboring (in all directions) platelet-shaped magnetic or magnetisable pigment particles. The magnetic-field generating devices and the methods described herein allow to bi-axially orient the platelet-shaped magnetic or magnetizable pigment particles described herein such that the platelet-shaped magnetic or magnetizable pigment particles form a sheet-like structure with their X and Y axes preferably substantially parallel to the substrate (x20) surface and are planarized in said two dimensions.

Suitable magnetic-field generating devices for mono-axially orienting the magnetic or magnetizable pigment particles described herein are not limited and include for example dipole magnets, quadrupolar magnets and combinations thereof. The following devices are provided herein as illustrative examples.

Optical effects known as flip-flop effects (also referred in the art as switching effect) include a first printed portion and a second printed portion separated by a transition, wherein pigment particles are aligned parallel to a first plane in the first portion and pigment particles in the second portion are aligned parallel to a second plane. Methods and magnets for producing said effects are disclosed for example in US 2005/0106367 and EP 1 819 525 B1.

Optical effects known as rolling-bar effects as disclosed in US 2005/0106367 may also be produced. A "rolling bar" effect is based on pigment particles orientation imitating a curved surface across the coating. The observer sees a specular reflection zone which moves away or towards the observer as the image is tilted. The pigment particles are aligned in a curving fashion, either following a convex curvature (also referred in the art as negative curved orientation) or a concave curvature (also referred in the art as positive curved orientation). Methods and magnets for producing said effects are disclosed for example in EP 2 263 806 A1, EP 1 674 282 B1, EP 2 263 807 A1, WO 2004/007095 A2, WO 2012/104098 A1, and WO 2014/198905 A2.

Optical effects known as Venetian-blind effects may also be produced. Venetian-blind effects include pigment particles being oriented such that, along a specific direction of observation, they give visibility to an underlying substrate surface, such that indicia or other features present on or in the substrate surface become apparent to the observer while they impede the visibility along another direction of observation Methods and magnets for producing said effects are disclosed for example in U.S. Pat. No. 8,025,952 and EP 1 819 525 B1.

Optical effects known as moving-ring effects may also be produced. Moving-ring effects consists of optically illusive images of objects such as funnels, cones, bowls, circles, ellipses, and hemispheres that appear to move in any x-y direction depending upon the angle of tilt of said optical effect layer. Methods and magnets for producing said effects are disclosed for example in EP 1 710 756 A1, U.S. Pat. No. 8,343,615, EP 2 306 222 A1, EP 2 325 677 A2, WO 2011/092502 A2, US 2013/084411, WO 2014 108404 A2 and WO2014/108303 A1.

Optical effects providing an optical impression of a pattern of moving bright and dark areas upon tilting said effect may also be produced. Methods and magnets for producing said effects are disclosed for example in WO 2013/167425 A1.

Optical effects providing an optical impression of a loop-shaped body having a size that varies upon tilting said effect may also be produced. Methods and magnets for producing these optical effects are disclosed for example in WO 2017/064052 A1, WO 2017/080698 A1 and WO 2017/148789 A1.

Optical effects providing an optical impression of one or more loop-shaped bodies having a shape that varies upon tilting the optical effect layer may also be produced. Methods and magnets for producing said effects are disclosed for example in WO 2018/054819 A1.

Optical effects providing an optical impression of a moon crescent moving and rotating upon tilting may also be produced. Methods and magnets for producing said effects are disclosed for example in WO 2019/215148 A1.

Optical effects providing an optical impression of a loop-shaped body having a size and shape that varies upon tilting may be produced. Methods and magnets for producing said effects are disclosed for example in the co-pending PCT patent application WO 2020/052862 A1.

Optical effects providing an optical impression of an ortho-parallactic effect, i.e. in the present case under the form of a bright reflective vertical bar moving in a longitudinal direction when the substrate is tilted about a horizontal/latitudinal axis or moving in a horizontal/latitudinal direction when the substrate is tilted about a longitudinal axis may be produced. Methods and magnets for producing said effects are disclosed for example in the co-pending PCT patent application PCT/EP2020/052265.

Optical effects providing an optical impression of one loop-shaped body surrounded by one or more loop-shaped bodies, wherein said one or more loop-shaped bodies have their shape and/or their brightness varying upon tilting may be produced. Methods and magnets for producing said effects are disclosed for example in the co-pending PCT patent application PCT/EP2020/054042.

Optical effects providing an optical impression of a plurality of dark spots and a plurality of bright spots moving and/or appearing and/or disappearing not only in a diagonal direction when the substrate is tilted about a vertical/longitudinal axis but also moving and/or appearing and/or disappearing in a diagonal direction when the substrate is tilted may be produced. Methods and magnets for producing said effects are disclosed for example in the co-pending EP patent applications EP19205715.6 and EP19205716.4.

The magnetic-field generating devices described herein may be at least partially embedded in a non-magnetic supporting matrix which is made of one or more non-magnetic materials.

The non-magnetic materials of the non-magnetic supporting plate (x40) described herein and the non-magnetic supporting matrix described herein are preferably independently selected from the group consisting of non-magnetic metals and engineering plastics and polymers. Non-magnetic metals include without limitation aluminum, aluminum alloys, brasses (alloys of copper and zinc), titanium, titanium alloys and austenitic steels (i.e. non-magnetic steels). Engineering plastics and polymers include without limitation polyaryletherketones (PAEK) and its derivatives polyetheretherketones (PEEK), polyetherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), Nylon® (polyamide) and PPS.

The magnetic-field generating devices described herein may comprise a magnetic plate carrying one or more reliefs, engravings or cut-outs. WO 2005/002866 A1 and WO 2008/046702 A1 are examples for such engraved magnetic plates.

Suitable magnetic-field generating devices for bi-axially orienting the platelet-shaped magnetic or magnetizable pigment particles described herein are not limited.

Particularly preferred devices for bi-axially orienting the pigment particles are disclosed in EP 2 157 141 A1. Upon motion of a substrate carrying a coating layer comprising pigment particles, the device disclosed in EP 2 157 141 A1 provides a dynamic magnetic field that changes its direction forcing the pigment particles to rapidly oscillate until both main axes, X-axis and Y-axis, become substantially parallel to the substrate surface, i.e. the pigment particles rotate until they come to the stable sheet-like formation with their X and Y axes substantially parallel to the substrate surface and are planarized in said two dimensions.

Other particularly preferred devices for bi-axially orienting the pigment particles comprise linear permanent magnet Halbach arrays, i.e. devices comprising a plurality of magnets with different magnetization directions and cylinder devices. Detailed description of Halbach permanent magnets was given by Z. Q. Zhu and D. Howe (Halbach permanent magnet machines and applications: a review, IEE. Proc. Electric Power Appl., 2001, 148, p. 299-308). The magnetic field produced by such a Halbach array has the properties that it is concentrated on one side while being weakened almost to zero on the other side. Linear Halbach arrays are disclosed for example in WO 2015/086257 A1 and WO 2018/019594 A1 and Halbach cylinder devices are disclosed in EP 3 224 055 B1.

Other particularly preferred devices for bi-axially orienting the pigment particles are spinning magnets, said magnets comprising disc-shaped spinning magnets or magnetic-field generating devices that are essentially magnetized along their diameter. Suitable spinning magnets or magnetic-field generating devices are described in US 2007/0172261 A1, said spinning magnets or magnetic-field generating devices generate radially symmetrical time-variable magnetic fields, allowing the bi-orientation of magnetic or magnetizable pigment particles of a not yet cured coating composition. These magnets or magnetic-field generating devices are driven by a shaft (or spindle) connected to an external motor. CN 102529326 B discloses examples of devices comprising spinning magnets that might be suitable for bi-axially orienting magnetic or magnetizable pigment particles. In a preferred embodiment, suitable devices for bi-axially orienting magnetic or magnetizable pigment particles are shaft-free disc-shaped spinning magnets or magnetic-field generating devices constrained in a housing made of non-magnetic, preferably non-conducting, materials and are driven by one or more magnet-wire coils wound around the housing. Examples of such shaft-free disc-shaped spinning magnets or magnetic-field generating devices are disclosed in WO 2015/082344 A1, WO 2016/026896 A1 and WO2018/141547 A1.

Figure 2B:
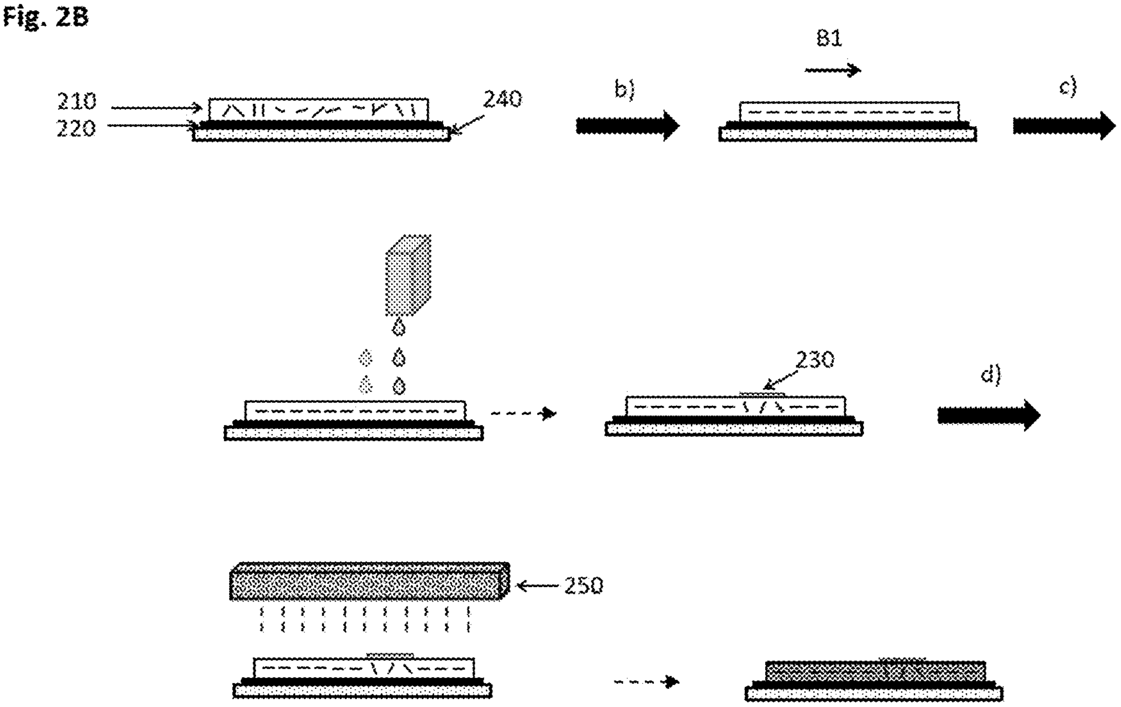
FIG. 2B schematically illustrates a method for producing an optical effect layer (OEL) exhibiting one or more indicia (230) on a substrate (220) according to the present invention. The method comprises a step b) of exposing the coating layer (210) to the magnetic field of the magnetic-field generating device (B1) so as to bi-axially orient at least a part of the magnetic or magnetisable pigment particles; subsequently to step b), the step c) of applying the top coating composition on top of the coating layer (210), wherein said top coating composition is applied in the form of one or more indicia (230); and a step d) of at least partially curing the coating layer (210) and the one or more indicia (230) with a curing unit (250).
Figure 2C:
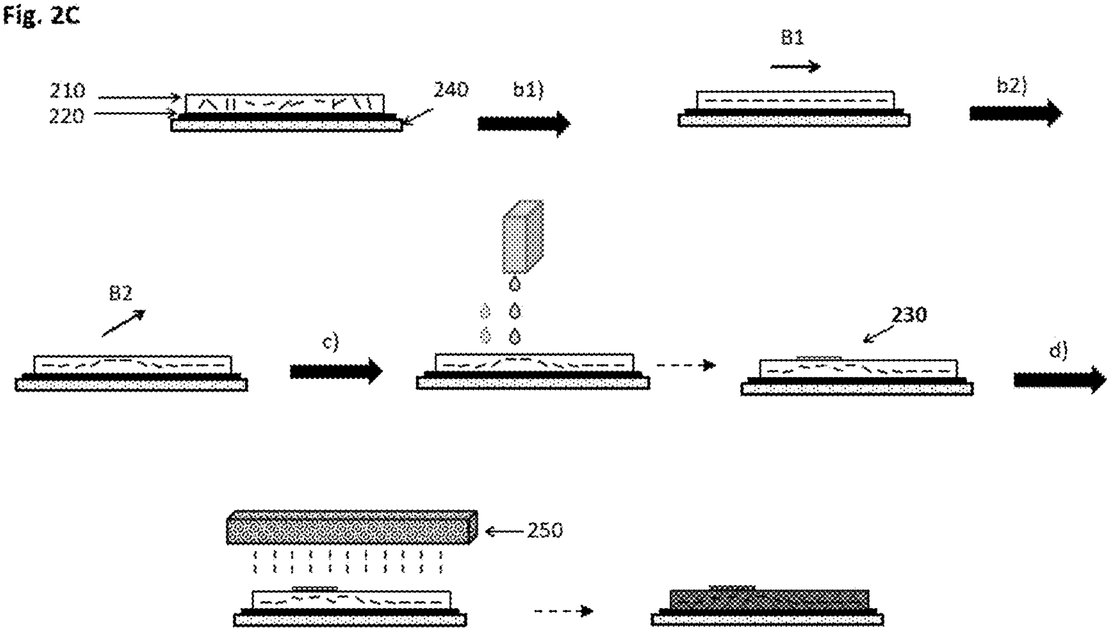
FIG. 2C schematically illustrates a method for producing an optical effect layer (OEL) exhibiting one or more indicia (230) on a substrate (220) according to the present invention. The method comprises a step b1) of exposing the coating layer (210) to the magnetic field of the magnetic-field generating device (B1) so as to bi-axially orient at least a part of the magnetic or magnetisable pigment particles; partially simultaneously with, simultaneously with or subsequently to step b1), a step b2) of exposing the coating layer (210) to the magnetic field of the second magnetic-field-generating device (B2) so as to mono-axially re-orient at least a part of the platelet-shaped magnetic or magnetisable particles; subsequently to step b2), the step c) of applying the top coating composition on top of the coating layer (210), wherein said top coating composition is applied in the form of one or more indicia (230); and a step d) of at least partially curing the coating layer (210) and the one or more indicia (230) with a curing unit (250).
Figures 1, 2D:
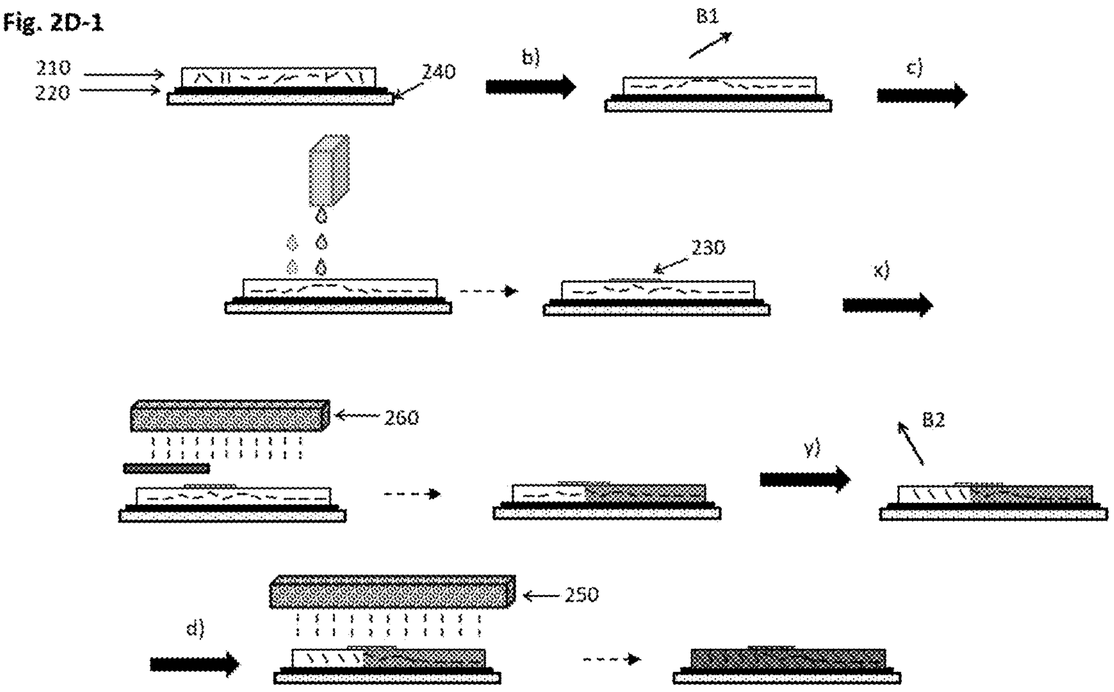
Figures 2, 2D:
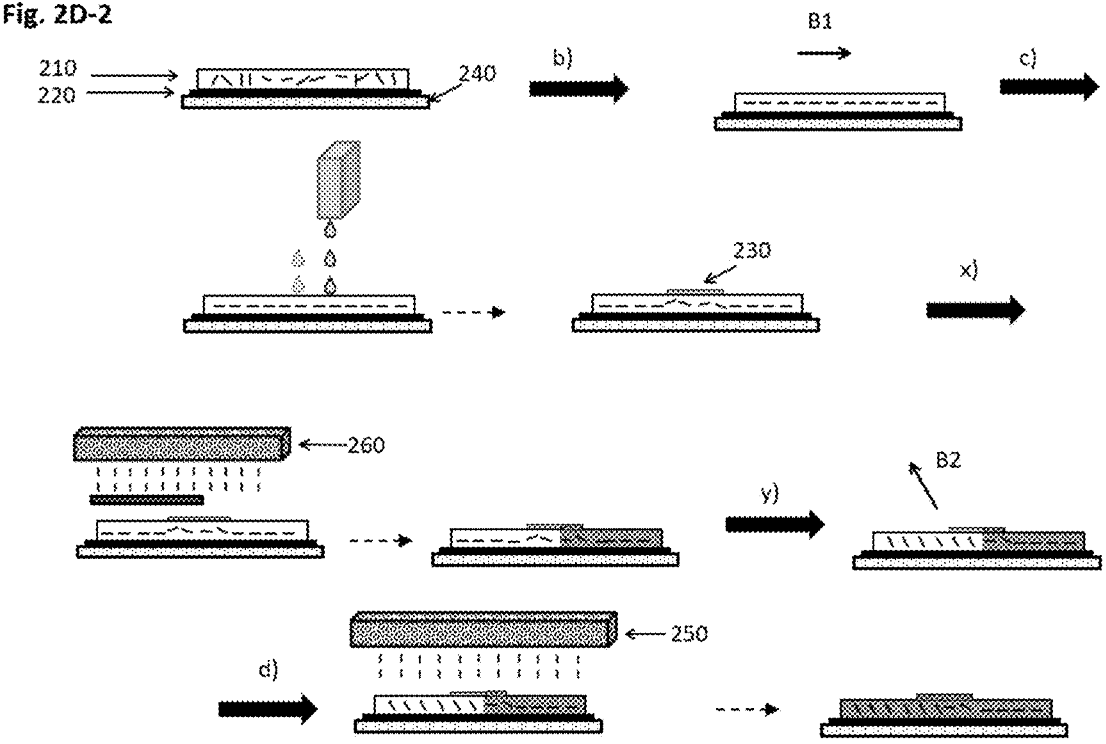
Figures 2, 2D, 3:
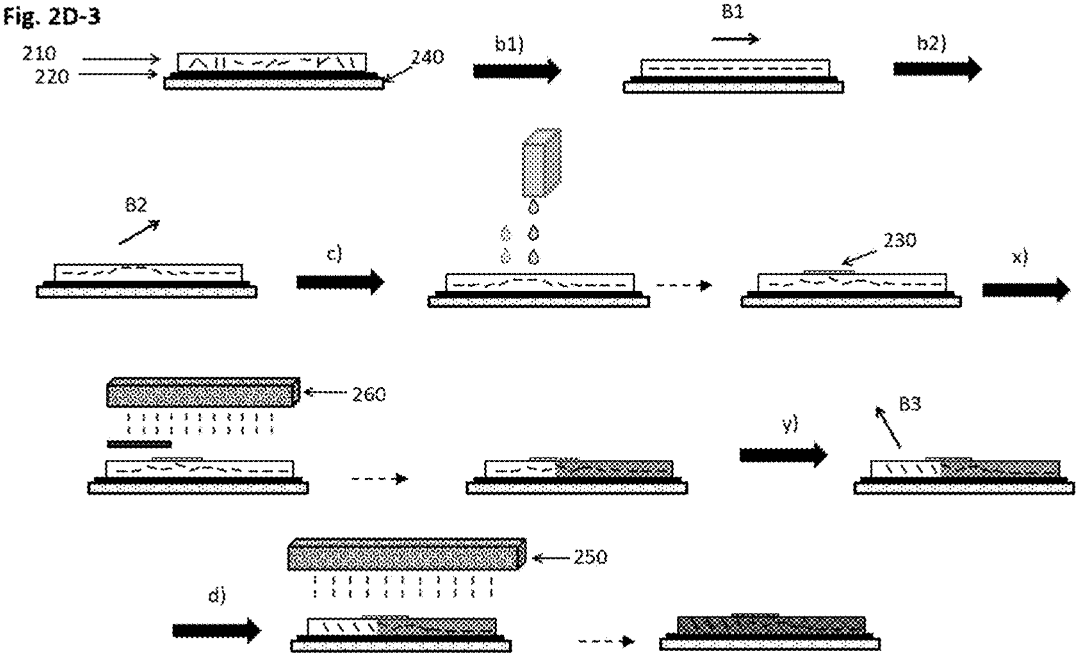

Other particularly preferred devices for bi-axially orienting the pigment particles are shown in FIG. 3 and comprise a) at least a first set (S1) and a second set (S2), each of the first and second sets (S1, S2) comprising one first bar dipole magnet having its magnetic axis oriented to be substantially parallel to the substrate during the magnetic orientation and two second bar dipole magnets having their magnetic axes oriented to be substantially perpendicular to the substrate; and b) a pair (P1) of third bar dipole magnets having their magnetic axes oriented to be substantially parallel to the substrate such as those disclosed in the co-pending European Patent application EP20176506.2.

The radiation curable coating composition described herein as well as the coating layer (x10) described herein comprise the non-spherical, preferably platelet-shaped, magnetic or magnetizable pigment particles described herein preferably in an amount from about 5 wt-% to about 40 wt-%, more preferably about 10 wt-% to about 30 wt-%, the weight percentages being based on the total weight of the radiation curable coating composition or the coating layer (x10).

In the OELs described herein, the magnetic or magnetizable pigment particles described herein are dispersed in the radiation curable coating composition comprising a cured binder material that fixes the orientation and position of the magnetic or magnetizable pigment particles. The binder material is at least in its cured or solid state (also referred to as second state herein), at least partially transparent to electromagnetic radiation of a range of wavelengths comprised between 200 nm and 3500 nm, i.e. within the wavelength range which is typically referred to as the "optical spectrum" and which comprises infrared, visible and UV portions of the electromagnetic spectrum. Accordingly, the particles contained in the binder material in its cured or solid state and their orientation-dependent reflectivity can be perceived through the binder material at some wavelengths within this range. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 μm of the cured binder material as present in the OEL (not including the platelet-shaped magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the cured binder material (not including the non-spherical magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range.

Suitable examples of non-spherical, preferably platelet-shaped, magnetic or magnetizable pigment particles described herein include without limitation pigment particles comprising a magnetic metal selected from the group consisting of cobalt (Co), iron (Fe), and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical, preferably platelet-shaped, magnetic or magnetizable pigment particles described herein include without limitation pigment particles comprising a magnetic layer M made from one or more of a magnetic metal such as cobalt (Co), iron (Fe), or nickel (Ni); and a magnetic alloy of iron, cobalt or nickel, wherein said magnetic or magnetizable pigment particles may be multilayered structures comprising one or more additional layers. Preferably, the one or more additional layers are layers A independently made from one or more selected from the group consisting of metal fluorides such as magnesium fluoride ($MgF_2$), silicon oxide (SiO), silicon dioxide ($SiO_2$), titanium oxide ($TiO_2$), and aluminum oxide ($Al_2O_3$), more preferably silicon dioxide ($SiO_2$); or layers B independently made from one or more selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A/multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

The radiation curable coating composition described herein may comprise non-spherical, preferably platelet-shaped, optically variable magnetic or magnetizable pigment particles, and/or non-spherical, preferably platelet-shaped, magnetic or magnetizable pigment particles having no optically variable properties. Preferably, at least a part of the magnetic or magnetizable pigment particles described herein is constituted by non-spherical, preferably platelet-shaped, optically variable magnetic or magnetizable pigment particles. In addition to the overt security provided by the colorshifting property of the optically variable magnetic or magnetizable pigment particles, which allows easily detecting, recognizing and/or discriminating an article or security document carrying an ink, coating composition, or coating layer comprising the optically variable magnetic or magnetizable pigment particles described herein from their possible counterfeits using the unaided human senses, the optical properties of the optically variable magnetic or magnetizable pigment particles may also be used as a machine readable tool for the recognition of the OEL. Thus, the optical properties of the optically variable magnetic or magnetizable pigment particles may simultaneously be used as a covert or semi-covert security feature in an authentication process wherein the optical (e.g. spectral) properties of the pigment particles are analyzed and thus increase the counterfeiting resistance.

The use of non-spherical, preferably platelet-shaped, optically variable magnetic or magnetizable pigment particles in coating layers for producing an OEL enhances the significance of the OEL as a security feature in security document applications, because such materials are reserved to the security document printing industry and are not commercially available to the public.

As mentioned above, preferably at least a part of the non-spherical, preferably platelet-shaped, magnetic or magnetizable pigment particles is constituted by non-spherical, preferably platelet-shaped, optically variable magnetic or magnetizable pigment particles. These are more preferably selected from the group consisting of magnetic thin-film interference pigment particles, magnetic cholesteric liquid crystal pigment particles, interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 B1; WO 2019/103937 A1; WO 2020/006286 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure and/or pigments particles having a multilayer structure combining one or more multilayer Fabry-Perot structures.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferred pigments particles having a multilayer structure combining one or more Fabry-Perot structures are those described in WO 2019/103937 A1 and consist of combinations of at least two Fabry-Perot structures, said two Fabry-Perot structures independently comprising a reflector layer, a dielectric layer and an absorber layer, wherein the reflector and/or the absorber layer can each independently comprise one or more magnetic materials and/or wherein a magnetic layer is sandwich between the two structures. WO 2020/006/286 A1 and EP 3 587 500 A1 disclose further preferred pigment particles having a multilayer structure.

Preferably, the reflector layers described herein are independently made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicium dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more selected from the group consisting of aluminum (Al), silver (Ag), copper (Cu), palladium (Pd), platinum (Pt), titanium (Ti), vanadium (V), iron (Fe), tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/Ni/Al/MgF_2/Cr$ multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 B1 whose content is hereby incorporated by reference in its entirety.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose platelet-shaped cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical, preferably platelet-shaped, magnetic or magnetizable pigment particles described herein preferably have a size d50 between about 2 μm and about 50 μm (as measured according by direct optical granulometry).

The non-spherical, preferably platelet-shaped, magnetic or magnetizable pigment particles described herein may be surface treated so as to protect them against any deterioration that may occur in the coating composition and coating layer and/or to facilitate their incorporation in said coating composition and coating layer; typically corrosion inhibitor materials and/or wetting agents may be used.

As mentioned herein, the method described herein comprises the step d) of at least partially curing the coating layer (x10) to a second state so as to fix the magnetic or magnetizable pigment particles in their adopted positions and orientations. The first liquid state of the radiation curable coating composition wherein the magnetic or magnetizable pigment particles can move and rotate and the second state wherein the magnetic or magnetizable pigment particles are fixed are provided by using a certain type of radiation curable coating composition. For example, the components of the radiation curable coating composition other than the non-spherical magnetic or magnetizable pigment particles may take the form of an ink or radiation curable coating composition such as those which are used in security applications, e.g. for banknote printing. The aforementioned first and second states are provided by using a material that shows an increase in viscosity in reaction to an exposure to an electromagnetic radiation. That is, when the fluid binder material is cured or solidified, said binder material converts into the second state, where the non-spherical magnetic or magnetizable pigment particles are fixed in their current positions and orientations and can no longer move nor rotate within the binder material. As used herein, by "at least partially curing the coating layer (x10)", it means that the non-spherical, preferably platelet-shaped, magnetic or magnetizable pigment particles are fixed/frozen in their adopted positions and orientations and cannot move and rotate anymore (also referred in the art as "pinning" of the particles).

The radiation curable coating composition used to produce the coating layer (x10) described herein comprises the non-spherical, preferably platelet-shaped, magnetic or magnetizable pigment particles described herein. Radiation curing, in particular UV-Vis curing, advantageously leads to an instantaneous increase in viscosity of the coating composition after exposure to the irradiation, thus preventing any further movement of the pigment particles and in consequence any loss of information after the magnetic orientation step. Preferably, the step d) of partially simultaneously with or subsequently to step c), at least partially curing the coating layer (x10) and the one or more indicia (x30) with the curing unit (x50) described herein is carried out by irradiation with UV-visible light (i.e. UV-Vis light radiation curing) or by E-beam (i.e. E-beam radiation curing), more preferably by irradiation with UV-Vis light. According to a preferred embodiment, the radiation curable coating composition comprising the non-spherical, preferably platelet-shaped, magnetic or magnetizable pigment particles described herein is a UV-Vis-curable coating composition.

Preferably, the UV-Vis-curable coating composition comprising the non-spherical, preferably platelet-shaped, magnetic or magnetizable pigment particles described herein is a radically curable composition; a cationically curable composition; or a radically and cationically (referred in the art as hybrid) curable composition. In other words, the UV-Vis-curable coating composition preferably comprises monomers and/or oligomers selected from radically curable compounds, cationically curable compounds and mixtures of radically and cationically curable compounds.

Cationically curable compositions comprises one or more cationically compounds which are cured by cationic mechanisms typically including the activation by radiation of one or more photoinitiators which liberate cationic species, such as acids, which in turn initiate the curing so as to react and/or cross-link the monomers and/or oligomers to thereby harden the coating composition. Preferably, the one or more cationically curable compounds are selected from the group consisting of vinyl ethers, propenyl ethers, cyclic ethers such as epoxides, oxetanes, and tetrahydrofuranes, lactones, cyclic thioethers, vinyl thioethers, propenyl thioethers, hydroxyl-containing compounds and mixtures thereof, preferably cationically curable compounds selected from the group consisting of vinyl ethers, propenyl ethers, cyclic ethers such as epoxides, oxetanes and tetrahydrofuranes, lactones, and mixtures thereof.

Radically curable compositions comprise one or more radically compounds that are cured by free radical mechanisms typically including the activation by radiation of one or more photoinitiators, thereby generating radicals which in turn initiate the polymerization so as to harden the coating composition. Preferably, the radically curable compounds are selected from (meth)acrylates, preferably selected from the group consisting of epoxy (meth)acrylates, (meth)acrylated oils, polyester and polyether (meth)acrylates, aliphatic or aromatic urethane (meth)acrylates, silicone (meth)acrylates, acrylic (meth)acrylates and mixtures thereof. The term "(meth)acrylate" refers to the acrylate as well as the corresponding methacrylate.

Hybrid curable compositions comprise one or more cationically compounds and one or more radically compounds which are cured by both mechanisms described herein.

Depending on the compounds used to prepare the UV-Vis-curable coating compositions comprising the non-spherical, preferably platelet-shaped, magnetic or magnetizable pigment particles described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodonium salts), oxonium (e.g. triaryloxonium salts) and sulfonium salts (e.g. triarylsulphonium salts), as well as mixtures of two or more thereof. Other examples of useful photoinitiators can be found in standard textbooks. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 3,4-diethyl-thioxanthone (DETX), polymeric derivatives (such as e.g. multifunctional thioxanthone compounds such as Omnipol TX, GENOPOL* TX-2, SpeedCure 7010) and mixtures of two or more thereof. The one or more photoinitiators comprised in the UV-Vis-curable coating compositions are preferably present in a total amount from about 0.1 wt-% to about 20 wt-%, more preferably about 1 wt-% to about 15 wt-%, the weight percents being based on the total weight of the UV-Vis-curable coating compositions.

The radiation curable coating composition comprising the non-spherical, preferably platelet-shaped, magnetic or magnetizable pigment particles described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the coating composition in amounts and in forms known in the art, including so-called nano-materials where at least one of the dimensions of the additive is in the range of 1 to 1000 nm.

The radiation curable coating composition comprising the non-spherical, preferably platelet-shaped, magnetic or magnetizable pigment particles described herein may further comprise one or more marker substances or taggants and/or one or more machine readable materials selected from the group consisting of magnetic materials (different from the magnetic or magnetizable pigment particles described herein), luminescent materials, electroluminescent materials, upconverting materials, electrically conductive materials and infrared-absorbing materials. As used herein, the term "machine readable material" refers to a material which exhibits at least one distinctive property which is detectable by a device or a machine, and which can be comprised in a coating so as to confer a way to authenticate said coating or article comprising said coating by the use of a particular equipment for its detection and/or authentication.

The radiation curable coating compositions described herein may be prepared by dispersing or mixing the magnetic or magnetizable pigment particles described herein and the one or more additives when present in the presence of the binder material described herein (in particular the UV-Vis-curable coating composition preferably comprises monomers and/or oligomers selected from radically curable compounds, cationically curable compounds and mixtures of radically and cationically curable compounds), thus forming liquid compositions. When present, the one or more photoinitiators may be added to the composition either during the dispersing or mixing step of all other ingredients or may be added at a later stage, i.e. after the formation of the liquid coating composition.

The method described herein further comprises, subsequently to the step b) described herein, the step c) of applying the top coating composition described herein on top of the coating layer (x10) described herein. The top coating composition described herein is applied in the form of the one or more indicia (x30) described herein and partially overlaps (i.e. overlaps in at least one area) the coating layer (x10) described herein, wherein the radiation curable coating composition of the coating layer (x10) is still in a wet and unpolymerized state and the magnetic or magnetizable pigment particles are freely movable and rotatable.

Preferably, the time between step b) described herein and step c) described herein is smaller than about 60 seconds, more preferably smaller than 5 seconds and still more preferably smaller than about 2 seconds. In other words, the step of applying the top coating composition on top of the coating layer (x10) and in the form of one or more indicia (x30) is carried out subsequently to step b), wherein the substrate (x20) carrying the coating layer (x10) has been removed from the magnetic field of the magnetic-field generating device.

As used herein, the term "indicia" shall mean continuous and discontinuous layers consisting of distinguishing markings or signs or patterns. Preferably, the one or more indicia (x30) described herein are selected from the group consisting of codes, symbols, alphanumeric symbols, motifs, geometric patterns (e.g. circles, triangles and regular or irregular polygons), letters, words, numbers, logos, drawings, portraits and combinations thereof. Examples of codes include encoded marks such as an encoded alphanumeric data, a one-dimensional barcode, a two-dimensional barcode, a QR-code, datamatrix and IR-reading codes. The one or more indicia (x30) described herein may be solids indicia and/or raster indicia.

The top coating composition described herein is applied in the form of the one or more indicia described herein (x30) by an application process preferably a contactless fluid microdispensing process, preferably selected from the group consisting of spray coating, aerosol jet printing, electrohydrodynamic printing and inkjet printing, more preferably by an inkjet printing process, wherein said inkjet printing processes are variable information printing methods allowing for the unique production of the one or more indicia (x30) on or in the optical effect layers (OELs) described herein. The application process is chosen as a function of the design and resolution of the one or more indicia to be produced.

Inkjet printing might be advantageously used for producing optical effect layers (OELs) exhibiting the one or more indicia described herein comprising variable halftones. Inkjet halftone printing is a reprographic technique that simulates continuous-tone imagery, comprising an infinite number of colors or greys, by the application of variable inkjet deposits or grammages.

Spray coating is a technique involving forcing the composition through a nozzle whereby a fine aerosol is formed. A carrier gas and electrostatic charging may be involved to aid in directing the aerosol at the surface that is to be printed. Spray printing allows to print spots and lines. Suitable compositions for spray printing typically have a viscosity between about 10 mPa·s and about 1 Pa·s (25° C., 1000 $s^{-1}$). Resolution of spray coating printing lies in the millimeter range. Spray printing is described for example in F. C. Krebs, Solar Energy Materials & Solar Cells (2009), 93, page 407.

Aerosol jet printing (AJP) is an emerging contactless direct write approach aimed at the production of fine features on a wide range of substrates. AJP is compatible with a wide material range and freeform deposition, allows high resolution (in the order of about 10 micrometers) coupled with a relatively large stand-off distance (e.g. 1-5 mm), in addition to the independence of orientation. The technology involves aerosol generation using either ultrasonic or pneumatic atomizer to generate an aerosol from compositions typically having a viscosity between about 1 mPa·s and about 1 Pa·s (25° C., 1000 $s^{-1}$). Aerosol jet printing is described for example in N. J. Wilkinson et al., The International Journal of Advanced Manufacturing Technology (2019) 105:4599-4619.

Electrohydrodynamic inkjet printing is a high resolution inkjet printing technology. Electrohydrodynamic inkjet printing technology makes use of externally applied electric fields to manipulate droplets sizes, ejection frequencies and placement on the substrate to get higher resolution than convention inkjet printing, while keeping a high production speed. The resolution of electrohydrodynamic inkjet printing is about two orders of magnitude higher than conventional inkjet printing technology; thus, it can be used for the orienting of nano- and micro-scale patterns. Electrohydrodynamic inkjet printing may be used both in DOD or in continuous mode. Compositions for electrohydrodynamic inkjet printing typically have a viscosity between about 1 mPa·s and about 1 Pa·s (25° C., 1000 $s^{-1}$). Electrohydrodynamic inkjet printing technology is described for example P. V. Raje and N. C. Murmu, International Journal of Emerging Technology and Advanced Engineering, (2014), 4(5), pages 174-183.

Slot die-coating is a 1-dimensional coating technique. Slot-die coating allows for the coating of stripes of material which is well suited for making a multilayer coating with stripes of different materials layered on top of each other. The alignment of the pattern is produced by the coating head being translated along the direction perpendicular to the direction of the web movement. A slot die-coating head comprises a mask that defines the slots of the coating head through which the slot-die coating ink is dispersed. An example of a slot-die coating head is illustrated in F. C. Krebs, Solar Energy Materials & Solar Cells (2009), 93, page 405-406. Suitable compositions for slot die-coating typically have a viscosity between about 1 mPa·s and about 20 mPa·s (25° C., 1000 $s^{-1}$).

According to one embodiment, the top coating composition described herein is printed in the form of the one or more indicia (x30) described herein by an inkjet printing process, preferably a continuous inkjet (CIJ) printing process or a drop-on-demand (DOD) inkjet printing process, more preferably a drop-on-demand (DOD) inkjet printing process. Drop-on-demand (DOD) printing is a non-contact printing process, wherein the droplets are only produced when required for printing, and generally by an ejection mechanism rather than by destabilizing a jet. Depending on the mechanism used in the printhead to produce droplets, the DOD printing is divided in piezo impulse, thermal jet, valve jet (viscosity between about 1 mPa·s and about 1 Pa·s (25° C., 1000 $s^{-1}$)) and electrostatic process.

According to one embodiment, the top coating composition described herein comprises one or more monomers and/or oligomers selected from radically curable compounds, cationically curable compounds and mixtures of radically and cationically curable compounds such as those described herein for the radiation curable coating composition comprising the magnetic or magnetizable pigment particles described herein. For embodiments wherein the radiation curable coating composition comprising the magnetic or magnetizable pigment particles is a cationically curable composition, the top coating composition preferably comprises one or more monomers and/or oligomers selected from cationically curable compounds such as those described herein for the radiation curable coating composition. For embodiments wherein the radiation curable coating composition comprising the magnetic or magnetizable pigment particles is a radically curable composition, the top coating composition preferably comprises one or more monomers and/or oligomers selected from radically curable compounds such as those described herein for the radiation curable coating composition. For embodiments wherein the radiation curable coating composition comprising the magnetic or magnetizable pigment particles is a hybrid curable composition, the top coating composition preferably comprises one or more monomers and/or oligomers selected from cationically curable compounds and/or the monomers and/or oligomers selected from radically curable compounds such as those described herein for the radiation curable coating composition. For embodiments wherein the top coating composition comprises one or more monomers and/or oligomers selected from radically curable compounds, cationically curable compounds and mixtures of radically and cationically curable compounds such as those described herein for the radiation curable coating composition described herein, and wherein said top coating composition is applied by a inkjet printing process, said top coating composition may further comprises conventional additives and ingredients such as for example, wetting agents, antifoams, surfactants, (co-)solvents and mixtures thereof that are used in the field of radiation curable inkjet According to another embodiment, the top coating composition described herein comprises one or more solvents. For embodiments wherein the top coating composition described herein comprises one or more solvents, a further step of applying heat may be carried out.

The top coating composition described herein may further comprise the one or more marker substances or taggants and/or the one or more machine readable materials such as those described for the coating layer (x10) comprising the non-spherical magnetic or magnetisable pigment particles described herein, provided that the size of said substances, taggants, materials is suitable for the application process described herein. As described herein, the top coating composition described herein does not comprise magnetic or magnetisable pigment particles.

The method described herein further comprises the step d) of partially simultaneously with or subsequently to step c), at least partially curing the coating layer (x10) and the one or more indicia (x30) with the curing unit (x50) described herein. By "partially simultaneously", it is meant that both steps are partly performed simultaneously, i.e. the times of performing each of the steps partially overlap. In the context described herein, when curing is performed partially simultaneously with the application step c), it must be understood that curing becomes effective after the formation of the one or more indicia before the complete or partial curing.

For embodiments of the method described herein wherein there is no intermediate step(s) between the step c) of applying the top coating composition on top of the coating layer (x10) described herein and the step d) of at least partially curing the coating layer (x10) and the one or more indicia (x30) with the curing unit (x50) described herein (see for example FIGS. 2A, 2B, 2C and 2E-1-2E3, the time between said step c) and the step d) is preferably between about 0 and 5 minutes, more preferably between about 0 and 1 minute, still more preferably between about 0 and 10 seconds and still more preferably between about 0 and 5 seconds.

The at least partial curing step described herein is a radiation at least partial curing step and UV-Vis light radiation curing is more preferred, since these technologies advantageously lead to very fast curing processes and hence drastically decrease the preparation time of any article comprising the OEL described herein. Moreover, radiation curing has the advantage of producing an almost instantaneous increase in viscosity of the coating compositions. Particularly preferred is radiation curing by photo-polymerization, under the influence of actinic light having a wavelength component in the UV or blue part of the electromagnetic spectrum (typically 200 nm to 650 nm; more preferably 200 nm to 420 nm). Equipment for UV-visible curing may comprise a high-power light-emitting-diode (LED) lamp, or an arc discharge lamp, such as a medium-pressure mercury arc (MPMA) or a metal-vapor arc lamp, as the source of the actinic radiation. The step d) of at least partially curing the coating layer (x10) and the one or more indicia (x30) is carried out with the curing unit (x50) described. Suitable curing units include equipments for UV-visible curing comprising a high-power light-emitting-diode (LED) lamp, or an arc discharge lamp, such as a medium-pressure mercury arc (MPMA) or a metal-vapor arc lamp, as the source of the actinic radiation.

Several embodiments for the steps b) and y) of exposing the coating layer (x10) to the magnetic field of the magnetic-field generating device are described herein are shown in FIG. 2A-E.

According to one embodiment shown in FIG. 2A, the method described herein comprises: the step b) of exposing the coating layer (x10) to the magnetic field of the magnetic-field generating device (B1) so as to mono-axially orient at least a part of the magnetic or magnetisable pigment particles; subsequently to step b), the step c) of applying the top coating composition on top of the coating layer (x10), wherein said top coating composition is applied in the form of one or more indicia (x30) described herein; and partially simultaneously with or subsequently to step c), the step d) of at least partially curing the coating layer (x10) and the one or more indicia (x30) with the curing unit (x50) described herein.

According to one embodiment shown in FIG. 2B, the method described herein comprises: the step b) of exposing the coating layer (x10) to the magnetic field of the magnetic-field generating device (B1) so as to bi-axially orient at least a part of the magnetic or magnetisable pigment particles, wherein said magnetic or magnetisable pigment particles are platelet-shaped magnetic or magnetisable pigment particles having an X-axis and a Y-axis defining a plane of predominant extension of the particles, Preferably, said step is carried out to bi-axially orient at least a part of the platelet-shaped magnetic or magnetisable pigment particles to have both their X-axes and Y-axes substantially parallel to the substrate surface;

subsequently to step b), the step c) of applying the top coating composition on top of the coating layer (x10), wherein said top coating composition is applied in the form of one or more indicia (x30) described herein; and partially simultaneously with or subsequently to step c), the step d) of at least partially curing the coating layer (x10) and the one or more indicia (x30) with the curing unit (x50) described herein.

According to one embodiment, the method described herein comprises:

the step b) described herein consists of two steps, the first step b1) consisting of exposing the coating layer (x10) to the magnetic field of the magnetic-field generating device (B1) so as to bi-axially orient at least a part of the magnetic or magnetisable pigment particles, wherein said magnetic or magnetisable pigment particles are platelet-shaped magnetic or magnetisable pigment particles having an X-axis and a Y-axis defining a plane of predominant extension of the particles and the further step b2) consisting of exposing the coating layer (x10) to the magnetic field of the second magnetic-field-generating device (B2) so as to mono-axially re-orient at least a part of the platelet-shaped magnetic or magnetisable particles, wherein said step b2) is carried out partially simultaneously with, simultaneously with or subsequently to the step b1) (see FIG. 2C wherein step b2) is carried out subsequently to step b1)); subsequently to step b), the step c) of applying the top coating composition on top of the coating layer (x10), wherein said top coating composition is applied in the form of one or more indicia (x30) described herein; and partially simultaneously with or subsequently to step c), the step d) of at least partially curing the coating layer (x10) and the one or more indicia (x30) with the curing unit (x50) described herein.

According to another embodiment shown in FIG. 2D-1, the method described herein comprises:

the step b) of exposing the coating layer (x10) to the magnetic field of the magnetic-field generating device (B1) so as to mono-axially orient at least a part of the magnetic or magnetisable pigment particles;

subsequently to step b), the step c) of applying the top coating composition on top of the coating layer (x10), wherein said top coating composition is applied in the form of one or more indicia (x30) described herein;

partially simultaneously with or subsequently to step c), a step x) of selectively at least partially curing one or more first areas of the coating layer (x10) to fix at least a part of the magnetic or magnetisable particles in their adopted positions and orientations, such that one or more second areas of the coating layer (x10) remain unexposed to irradiation, said selectively at least partially curing step being carried out by the selective curing unit (x60) described herein;

subsequently to step x), a step y) of exposing the coating layer (x10) to the magnetic field of the second magnetic-field-generating device (B2) so as to mono-axially orient at least a part of the magnetic or magnetisable pigment particles of the one or more second areas of the coating layer (x10); and partially simultaneously with or subsequently to step y), the step d) of at least partially curing the coating layer (x10) and the one or more indicia (x30) with the curing unit (x50) described herein.

wherein said step y) is carried out partially simultaneously with or prior to the step d).

According to another embodiment shown in FIG. 2D-2, the method described herein comprises:

the step b) of exposing the coating layer (x10) to the magnetic field of the magnetic-field generating device (B1) is carried out so as to bi-axially orient at least a part of the magnetic or magnetisable pigment particles;

subsequently to step b), the step c) of applying the top coating composition on top of the coating layer (x10), wherein said top coating composition is applied in the form of one or more indicia (x30) described herein;

partially simultaneously with or subsequently to step c), a step x) of selectively at least partially curing one or more first areas of the coating layer (x10) to fix at least a part of the magnetic or magnetisable particles in their adopted positions and orientations, such that one or more second areas of the coating layer (x10) remain unexposed to irradiation, said selectively at least partially curing step being carried out by the selective curing unit (x60) described herein;

subsequently to step x), a step y) of exposing the coating layer (x10) to the magnetic field of the second magnetic-field-generating device (B2) so as to mono-axially orient at least a part of the magnetic or magnetisable pigment particles of the one or more second areas of the coating layer (x10); and partially simultaneously with or subsequently to step y), the step d) of at least partially curing the coating layer (x10) and the one or more indicia (x30) with the curing unit (x50) described herein.

According to another embodiment, the method described herein comprises:

the step b) consisting of the two steps described herein, the first step b1) consisting of exposing the coating layer (x10) to the magnetic field of the magnetic-field generating device (B1) so as to bi-axially orient at least a part of the magnetic or magnetisable pigment particles and the further step b2) consists of exposing the coating layer (x10) to the magnetic field of the second magnetic-field-generating device (B2) so as to mono-axially re-orient at least a part of the platelet-shaped magnetic or magnetisable particles, wherein said further step b2) is carried out partially simultaneously with, simultaneously with or subsequently to the step b1) (see FIG. 2D-3 wherein step b2) is carried out subsequently to step b1)); subsequently to step b), the step c) of applying the top coating composition on top of the coating layer (x10), wherein said top coating composition is applied in the form of one or more indicia (x30) described herein;

partially simultaneously with or subsequently to step c), a step x) of selectively at least partially curing one or more first areas of the coating layer (x10) to fix at least a part of the magnetic or magnetisable particles in their adopted positions and orientations, such that one or more second areas of the coating layer (x10) remain unexposed to irradiation, said selectively at least partially curing step being carried out by the selective curing unit (x60) described herein;

subsequently to step x), a step y) of exposing the coating layer (x10) to the magnetic field of the third magnetic-field-generating device (B3) so as to mono-axially re-orient at least a part of the magnetic or magnetisable pigment particles of the one or more second areas of the coating layer (x10); and partially simultaneously with or subsequently to step y), the step d) of at least partially curing the coating layer (x10) and the one or more indicia (x30) with the curing unit (x50) described herein.

Figures 1, 2E:
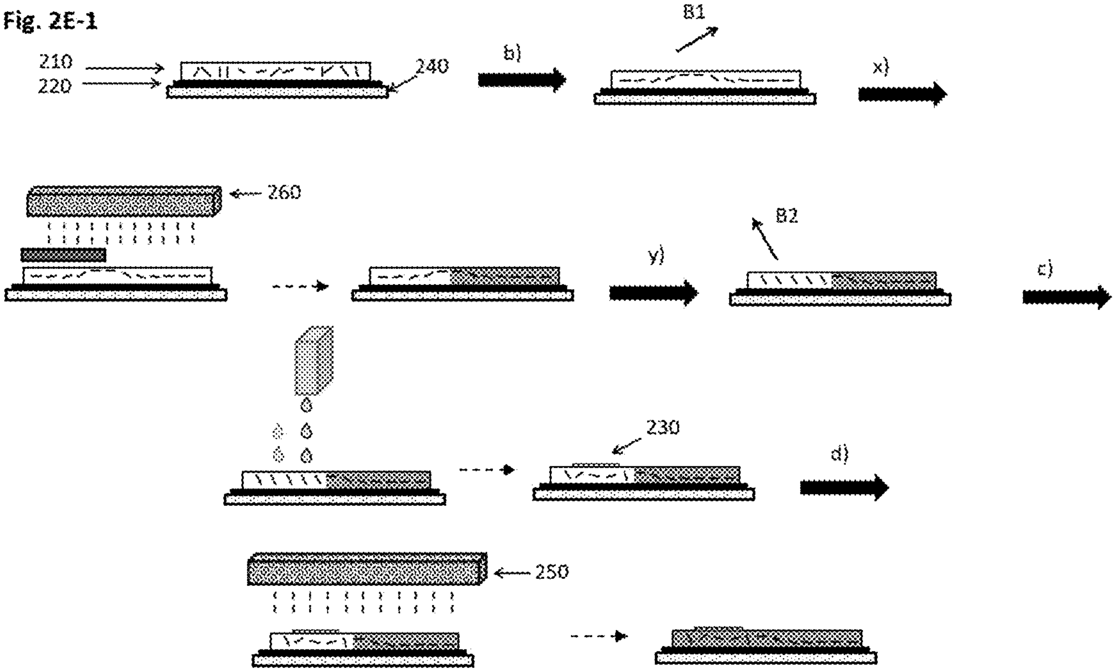
Figures 2, 2E:
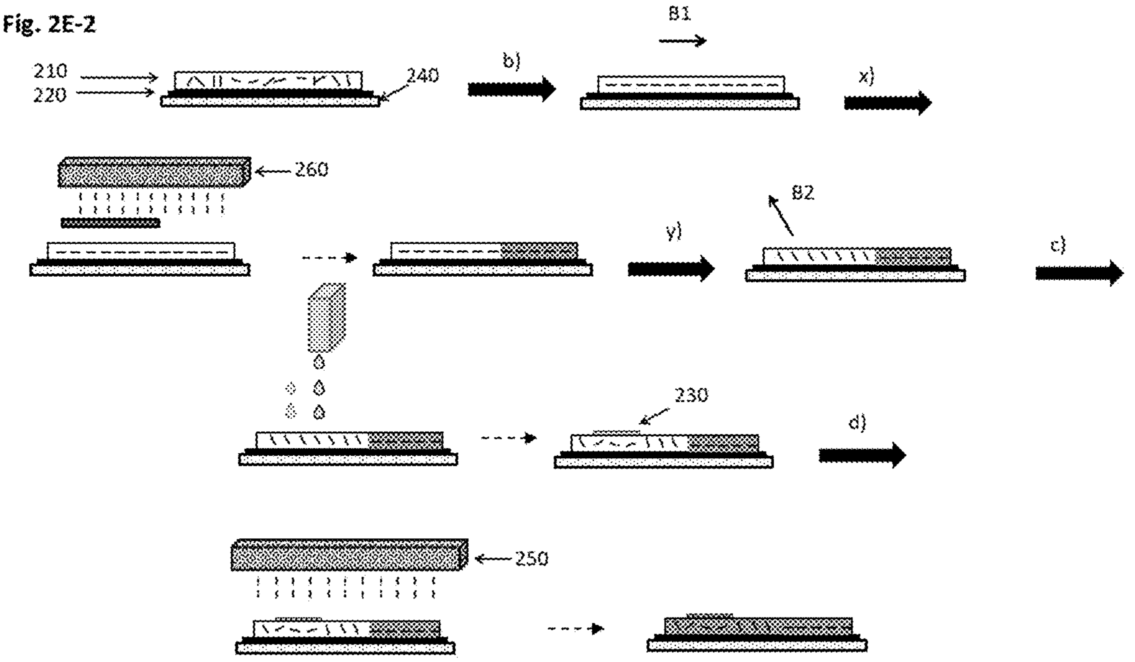
Figures 2, 2E, 3:
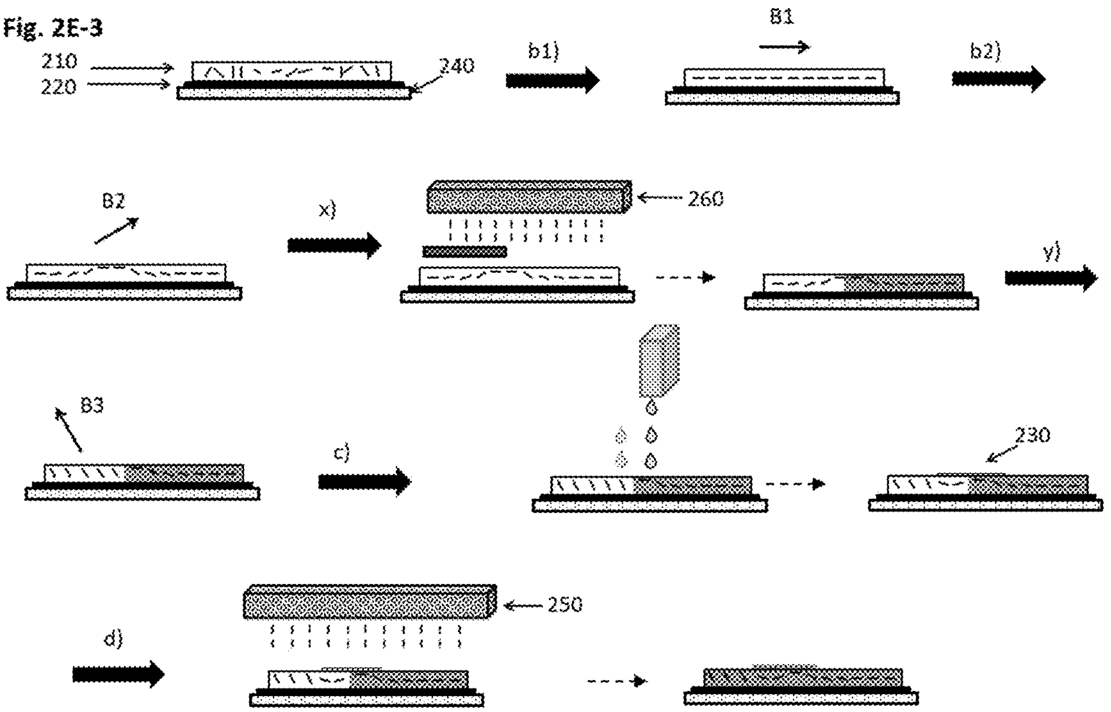
Figure 3:
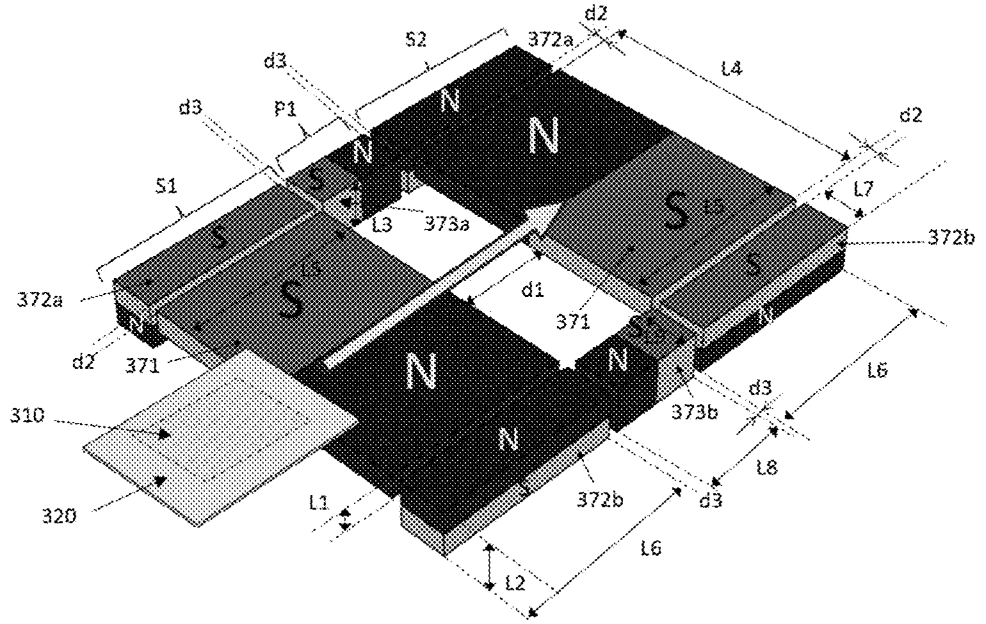

According to another embodiment shown in FIG. 2E-1, the method described herein comprises: the step b) of exposing the coating layer (x10) to the magnetic field of the magnetic-field generating device (B1) is carried out so as to mono-axially orient at least a part of the magnetic or magnetisable pigment particles;

partially simultaneously with or subsequently to step b), a step x) of selectively at least partially curing one or more first areas of the coating layer (x10) to fix at least a part of the magnetic or magnetisable particles in their adopted positions and orientations, such that one or more second areas of the coating layer (x10) remain unexposed to irradiation, said selectively at least partially curing step being carried out by the selective curing unit (x60) described herein;

subsequently to step x), a step y) of exposing the coating layer (x10) to the magnetic field of the second magnetic-field-generating device (B2) so as to mono-axially re-orient at least a part of the magnetic or magnetisable pigment particles of the one or more second areas of the coating layer (x10);

subsequently to step y), the step c) of applying the top coating composition on top of the coating layer (x10), wherein said top coating composition is applied in the form of one or more indicia (x30) described herein; and partially simultaneously with or subsequently to step c), the step d) of at least partially curing the coating layer (x10) and the one or more indicia (x30) with the curing unit (x50) described herein.

According to another embodiment shown in FIG. 2E-2, the method described herein comprises: the step b) of exposing the coating layer (x10) to the magnetic field of the magnetic-field generating device (B1) so as to bi-axially orient at least a part of magnetic or magnetisable pigment particles;

partially simultaneously with or subsequently to step b), a step x) of selectively at least partially curing one or more first areas of the coating layer (x10) to fix at least a part of the magnetic or magnetisable particles in their adopted positions and orientations, such that one or more second areas of the coating layer (x10) remain unexposed to irradiation, said selectively at least partially curing step being carried out by the selective curing unit (x60) described herein;

subsequently to step x), a step y) of exposing the coating layer (x10) to the magnetic field of the second magnetic-field-generating device (B2) so as to mono-axially orient at least a part of the magnetic or magnetisable pigment particles of the one or more second areas of the coating layer (x10);

subsequently to step y), the step c) of applying the top coating composition on top of the coating layer (x10), wherein said top coating composition is applied in the form of one or more indicia (x30) described herein; and partially simultaneously with or subsequently to step c), the step d) of at least partially curing the coating layer (x10) and the one or more indicia (x30) with the curing unit (x50) described herein.

According to another embodiment, the method described herein comprises:

the step b) consisting of the two steps described herein, the first step b1) consisting of exposing the coating layer (x10) to the magnetic field of the magnetic-field generating device (B1) so as to bi-axially orient at least a part of the magnetic or magnetisable pigment particles and the further step b2) consisting of exposing the coating layer (x10) to the magnetic field of the second magnetic-field-generating device (B2) so as to mono-axially orient at least a part of the platelet-shaped magnetic or magnetisable particles, wherein said further step b2) is carried out partially simultaneously with, simultaneously with or subsequently to the step b1) (see FIG. 2E-3 wherein step b2) is carried out subsequently to step b1));

subsequently to or partially simultaneously with step b), a step x) of selectively at least partially curing one or more first areas of the coating layer (x10) of the radiation curable coating composition of step b) so as to fix at least a part of the magnetic or magnetisable particles in their adopted positions and orientations, such that one or more second areas of the coating layer (x10) remain unexposed to irradiation, said selectively at least partially curing step being carried out by the selective curing unit (x60) described herein;

subsequently to step x), a step y) of exposing the coating layer (x10) to the magnetic field of the third magnetic-field-generating device (B3) so as to mono-axially orient at least a part of the magnetic or magnetisable pigment particles of the one or more second areas of the coating layer (x10);

subsequently to step y), the step c) of applying the top coating composition on top of the coating layer (x10), wherein said top coating composition is applied in the form of one or more indicia (x30) described herein; and partially simultaneously with or subsequently to step c), the step d) of at least partially curing the coating layer (x10) and the one or more indicia (x30) with the curing unit (x50) described herein.

For embodiments described herein comprising the step x) of selectively at least partially curing one or more first areas of the coating layer (x10) of the radiation curable coating composition of step b) or step c) so as to fix at least a part of the magnetic or magnetisable particles in their adopted positions and orientations, such that one or more second areas of the coating layer (x10) remain unexposed to irradiation described herein, a selective curing unit (x60) is used. Selective curing allows the production of optical effect layers (OELs) exhibiting a motif made of different areas, wherein said different areas have different magnetic orientation patterns. The selective curing unit (x60) may comprise the curing unit (x50) described herein and one or more fixed or removable photomasks including one or more voids corresponding to a pattern to be formed as a part of the coating layer. Alternatively, the selective curing unit (x60) may be addressable such as the scanning laser beam disclosed in EP 2 468 423 A1, an array of light-emitting diodes (LEDs) disclosed in WO 2017/021504 A1 or an actinic radiation LED source (x41) comprising an array of individually addressable actinic radiation emitters disclosed in the co-pending patent application PCT/EP2019/087072.

The present invention provides the methods described herein to produce optical effect layers (OELs) exhibiting one or more indicia (x30) on the substrates (x20) described herein and substrates (x20) comprising one or more optical effect layers (OELs) obtained thereof. The substrate (x20) described herein is preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. According to another embodiment, the substrate (x20)

described herein is based on plastics and polymers, metallized plastics or polymers, composite materials and mixtures or combinations of two or more thereof. Suitable examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical examples of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc. When the OELs exhibiting one or more indicia (x30) produced according to the present invention are used for decorative or cosmetic purposes including for example fingernail lacquers, said OEL may be produced on other type of substrates including nails, artificial nails or other parts of an animal or human being.

Also described herein are methods of manufacturing a security document or a decorative element or object, comprising a) providing a security document or a decorative element or object, and b) providing the one or more optical effect layers described herein, in particular such as those obtained by the method described herein, so that it is comprised by the security document or decorative element or object.

Should the OEL produced according to the present invention be on a security document or article, and with the aim of further increasing the security level and the resistance against counterfeiting and illegal reproduction of said security document or article, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents and articles, the substrate may comprise one or more marker substances or taggants and/or machine readable substances (e.g. luminescent substances, UV/visible/IR absorbing substances, magnetic substances and combinations thereof).

If desired, a primer layer may be applied to the substrate prior to the step a). This may enhance the quality of the OEL described herein or promote adhesion. Examples of such primer layers may be found in WO 2010/058026 A2.

With the aim of increasing the durability through soiling or chemical resistance and cleanliness and thus the circulation lifetime of a security document, article or a decorative element or object comprising the OEL obtained by the method described herein, or with the aim of modifying their aesthetical appearance (e.g. optical gloss), one or more protective layers may be applied on top of the OEL. When present, the one or more protective layers are typically made of protective varnishes. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the OEL.

The present invention further provides optical effect layers (OELs) exhibiting the one or more indicia (x30) described herein and produced by the methods described herein. The shape of the optical effect layers (OELs) described herein may be continuous or discontinuous. According to one embodiment, the shape of the coating layer (x10) represent one or more indicia, dots and/or lines, wherein said indicia may have the same shape as the one or more indicia (x30) made of the top coating composition described herein or may have a different shape.

The OEL exhibiting one or more indicia (x30) described herein may be provided directly on a substrate on which it shall remain permanently (such as for banknote applications). Alternatively, an optical effect layer may also be provided on a temporary substrate for production purposes, from which the OEL is subsequently removed. This may for example facilitate the production of the optical effect layer (OEL), particularly while the binder material is still in its fluid state. Thereafter, after curing of the coating composition for the production of the OEL, the temporary substrate may be removed from the OEL.

Alternatively, in another embodiment an adhesive layer may be present on the exhibiting one or more indicia (x30) or may be present on the substrate comprising the OEL, said adhesive layer being on the side of the substrate opposite to the side where the OEL is provided or on the same side as the OEL and on top of the OEL. Therefore, an adhesive layer may be applied to the OEL or to the substrate, said adhesive layer being applied after the curing step has been completed. Such an article may be attached to all kinds of documents or other articles or items without printing or other processes involving machinery and rather high effort. Alternatively, the substrate described herein comprising the OEL described herein may be in the form of a transfer foil, which can be applied to a document or to an article in a separate transfer step. For this purpose, the substrate is provided with a release coating, on which the OELs are produced as described herein. One or more adhesive layers may be applied over the so produced optical effect layer.

Also described herein are substrates comprising more than one, i.e. two, three, four, etc. optical effect layers (OELs) obtained by the method described herein.

Also described herein are articles, documents, in particular security documents, decorative elements and decorative objects comprising the optical effect layer (OEL) produced according to the present invention. The articles, in particular security documents, decorative elements or objects, may comprise more than one (for example two, three, etc.) OELs produced according to the present invention.

As mentioned hereabove, the OEL produced according to the present invention may be used for decorative purposes as well as for protecting and authenticating a security document.

Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets, academic diploma or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) described herein may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompassed by the present invention.

Further, all documents referred to throughout this specification are hereby incorporated by reference in their entirety as set forth in full herein.

EXAMPLES

The present invention is now described in more details with reference to non-limiting examples. The Examples below provide more details for the production of optical effects layers (OELs) exhibiting one or more indicia. Four series of combinations of UV-Vis curable screen printing compositions and top coating inkjet printing composition have been prepared and are described in Tables 1-3.

Table 1A: Combination of a radically UV-Vis curable screen printing composition comprising platelet-shaped magnetic or magnetisable pigment particles and a top coating inkjet printing composition (E1, E3-E6 and C1-C5).

Table 1B: Combination of a radically UV-Vis curable screen printing composition comprising platelet-shaped magnetic or magnetisable pigment particles and a top coating inkjet printing composition (E2).

Table 1C: Combination of a radically UV-Vis curable screen printing composition comprising platelet-shaped magnetic or magnetisable pigment particles and a top coating inkjet printing composition (C11).

Table 2: Combination of a cationically UV-Vis curable screen printing composition comprising platelet-shaped magnetic or magnetisable pigment particles and a top coating inkjet printing composition (E7-E11, E17, E19-E21 and C6-C10).

Table 3: Combination of a hybrid UV-Vis curable screen printing composition comprising platelet-shaped magnetic or magnetisable pigment particles and a top coating inkjet printing composition (E12-E16 and E18).

TABLE 1A

| Radically UV-Vis curable screen printing composition | | Top coating inkjet printing composition | |
|---|---|---|---|
| Ingredients | wt % | Ingredient | wt % |
| Epoxyacrylate oligomer (Allnex) | 28 | GENOMER* 1120 3,3,5-trimethyl cyclohexyl acrylate (Rahn) [CAS No 86178-38-3] | 100 |
| Trimethylolpropane triacrylate monomer (Allnex) [CAS No 15625-89-5] | 19.5 | | |
| Tripropyleneglycol diacrylate monomer (Allnex) [CAS No 42978-66-5] | 20 | | |
| Genorad* 16 (Rahn) polymerization inhibitor (Rahn) (CAS No not available) | 1 | | |
| AEROSIL ® 200 fumed silica (Evonik) (CAS No not available) | 1 | | |
| SpeedCure TPO-L ethyl(2,4,6-trimethylbenzoyl)phenylphosphinate (Lambson) [Cas No 84434-11-7] | 2 | | |
| Omnirad 500 (IGM) 50% 1-Hydroxy-cyclohexyl-phenyl-ketone and 50% benzophenone (BASF) [CAS No 947-19-3, 119-61-9]] | 6 | | |
| Genocure ® EPD ethyl-4-dimethylaminobenzoate (Rahn) [CAS No 10287-53-3] | 2 | | |
| BYK ® 371 solution of polyester modified acrylic functional poly-dimethyl-siloxane (BYK) (CAS No not available) | 2 | | |
| TEGO ® Foamex N dimethyl polysiloxane containing fumed silica (Evonik) (CAS No not available) | 2 | | |
| magnetic pigment particles (*) | 16.5 | | |
| Viscosity/mPas | 570 | Viscosity/mPas | 3 |

(*) 7-layer gold-to-green platelet-shaped optically variable magnetic pigment particles having a flake shape of diameter $d_{50}$ about 10.7 μm and thickness about 1 μm, obtained from VIAVI Solutions, Santa Rosa, CA.

TABLE 1B

| Radically UV-Vis curable screen printing composition | | Top coating inkjet printing composition | |
|---|---|---|---|
| Ingredients | wt % | Ingredient | wt % |
| GENOMER* 4316 Aliphatic polyester urethane acrylate (Rahn) | 26.0 | GENOMER* 1120 3,3,5-Trimethyl cyclohexyl acrylate (Rahn) [CAS No 86178-38-3] | 100 |
| MIRAMER M3190 trimethylolpropane (EO)$_9$ triacrylate (Rahn) [CAS No 28961-43-5] | 26.2 | | |
| MIRAMER M282 polyethylene glycol 200 diacrylate (Rahn) [CAS No 26570-48-9] | 20.2 | | |
| GENORAD* 16 polymerization inhibitor (Rahn) (CAS No not available) | 0.5 | | |
| AEROSIL ® 200 fumed silica (Evonik) (CAS No not available) | 1.3 | | |
| TEGO ® Airex 900 anti-foaming agent (Evonik) [CAS No 67762-90-7] | 1.0 | | |
| SpeedCure TPO-L ethyl (2,4,6-trimethylbenzoyl) phenyl phosphinate (Lambson) [CAS No 84434-11-7] | 2.9 | | |
| Omnirad 1173 2-hydroxy-2-methyl-1-phenyl-propan-1-one) (IGM) [CAS No 7473-98-5] | 5.0 | | |
| GENOCURE* DETX 2,4-diethyl-thioxanthone (Rahn) [CAS No 82799-44-8] | 0.4 | | |
| magnetic pigment particles (*) | 16.5 | | |
| Viscosity/mPas | 640 | Viscosity/mPas | 3 |

(*) 7-layer gold-to-green platelet-shaped optically variable magnetic pigment particles having a flake shape of diameter $d_{50}$ about 10.7 μm and thickness about 1 μm, obtained from VIAVI Solutions, Santa Rosa, CA.

TABLE 1C

| Radically UV-Vis curable screen printing composition | | Top coating inkjet printing composition | |
|---|---|---|---|
| Ingredients | wt % | Ingredients | wt % |
| Epoxyacrylate oligomer (Allnex) | 28 | TPGDA DEO ® tripropyleneglycol diacrylate monomer (Rahn) [CAS No 42978-66-5] | 94 |
| Trimethylolpropane triacrylate monomer (Allnex) [CAS No 15625-89-5] | 19.5 | | |
| Tripropyleneglycol diacrylate monomer (Allnex) [CAS No 42978-66-5] | 20 | | |
| Genorad* 16 (Rahn) polymerization inhibitor (Rahn) (CAS No not available) | 1 | | |
| AEROSIL ® 200 fumed silica (Evonik) (CAS No not available) | 1 | | |
| SpeedCure TPO-L ethyl(2,4,6-trimethyl-benzoyl)phenylphosphinate (Lambson) [Cas No 84434-11-7] | 2 | | |
| Omnirad 500 (IGM) 50% 1-Hydroxy-cyclohexyl-phenyl-ketone and 50% benzophenone (BASF) [CAS No 947-19-3, 119-61-9]] | 6 | SpeedCure TPO-L ethyl(2,4,6-trimethyl-benzoyl)phenyl-phosphinate (Lambson) [Cas No 84434-11-7] | 6 |
| Genocure ® EPD ethyl-4-dimethylaminobenzoate (Rahn) [CAS No 10287-53-3] | 2 | | |
| BYK ® 371 solution of polyester modified acrylic functional poly-dimethyl-siloxane (BYK) (CAS No not available) | 2 | | |
| TEGO ® Foamex N dimethyl polysiloxane containing fumed silica (Evonik) (CAS No not available) | 2 | | |
| magnetic pigment particles (*) | 16.5 | | |
| Viscosity/mPas | 570 | Viscosity/mPas | 15 |

(*) 7-layer gold-to-green platelet-shaped optically variable magnetic pigment particles having a flake shape of diameter $d_{50}$ about 10.7 μm and thickness about 1 μm, obtained from VIAVI Solutions, Santa Rosa, CA.

TABLE 2

| Cationically UV-Vis curable screen printing composition | | Top coating inkjet printing composition | |
|---|---|---|---|
| Ingredients | wt % | Ingredient | wt % |
| UviCure S105ES 7-oxabicyclo[4.1.0]hept-3-ylmethyl 7-oxabicyclo[4.1.0]heptane-3-carboxylat) (Lambson) [CAS No 2386-87-0] | 57.6 | UviCure S105ES (Lambson) [CAS No 2386-87-0] | 25 |
| diethylene glycol divinyl ether (BASF) [CAS No 764-99-8] | 4.2 | | |
| POLYOL R4631 pentaerythritol, ethoxylated and propoxylated (Perstorp) [CAS No 30374-35-7] | 8.4 | | |
| UviCure S130 3-ethyloxetane-3-methanol (Lambson) [CAS No 3047-32-3] | 4.2 | | |
| Aerosil® 200 fumed silica (Evonik) | 1.7 | | |
| TEGO ® Airex 900 anti-foaming agent (Evonik) [Cas No 67762-90-7] | 2.1 | Triethylene glycol divinyl ether (BASF) [CAS No 765-12-8] | 75 |
| Omnicat 440 4,4'-dimethyl-diphenyl iodonium hexafluorophosphate (IGM) [CAS No 60565-88-0] | 3.4 | | |
| GENOCURE* ITX 2-isopropyl-9H-thioxanthen-9-one (Rahn) [CAS No 5495-84-1] | 0.4 | | |
| propylene carbonate [CAS No 108-32-7] | 1.5 | | |
| magnetic pigment particles (*) | 16.5 | | |
| Viscosity/mPas | 960 | Viscosity / mPas | 6 |

(*) 7-layer gold-to-green platelet-shaped optically variable magnetic pigment particles having a flake shape of diameter $d_{50}$ about 10.7 μm and thickness about 1 μm, obtained from VIAVI Solutions, Santa Rosa, CA.

TABLE 3

| Hybrid UV-Vis curable screen printing composition | | Top coating inkjet printing composition | |
|---|---|---|---|
| Ingredients | wt % | Ingredient | wt % |
| UviCure S105ES 7-oxabicyclo[4.1.0]hept-3-ylmethyl 7-oxabicyclo[4.1.0]heptane-3-carboxylate (Lambson) [CAS No 2386-87-0] | 37.2 | UviCure S105ES (Lambson) [CAS No 2386-87-0] | 25 |
| diethylene glycol divinyl ether (BASF) [CAS No 764-99-8] | 4.2 | | |

TABLE 3-continued

| Hybrid UV-Vis curable screen printing composition | | Top coating inkjet printing composition | |
|---|---|---|---|
| Ingredients | wt % | Ingredient | wt % |
| POLYOL R4631 pentaerythritol, ethoxylated and propoxylated (Perstorp) [CAS No 30374-35-7] | 8.4 | | |
| UviCure S130 3-ethyloxetane-3-methanol (Lambson or Perstorp) [CAS No 3047-32-3] | 4.2 | | |
| MIRAMER M4004 pentaerythritol $(EO)_n$ tetraacrylate (Rahn) [CAS No 51728-26-8] | 16.7 | | |
| Aerosil ® 200 fumed silica (Evonik) (CAS No not available) | 1.7 | | |
| TEGO ® Airex 900 anti-foaming agent (Evonik) [Cas No 67762-90-7] | 2.0 | | |
| Omnicat 440 4,4'-dimethyl-diphenyl iodonium hexafluorophosphate (IGM) [CAS No 60565-88-0] | 3.4 | Triethylene glycol divinyl ether (BASF) [CAS No 765-12-8] | 75 |
| Omnirad 1173 2-hydroxy-2-methyl-1-phenyl-propan-1-one) (IGM) [CAS No 7473-98-5] | 3.8 | | |
| GENOCURE* ITX iso-propyl-thioxanthone (Rahn) [CAS No 5495-84-1] | 0.4 | | |
| propylene carbonate [CAS No 108-32-7] | 1.5 | | |
| magnetic pigment particles (*) | 16.5 | | |
| Viscosity/mPas | 940 | Viscosity/mPas | 6 |

(*) 7-layer gold-to-green platelet-shaped optically variable magnetic pigment particles having a flake shape of diameter $d_{50}$ about 10.7 μm and thickness about 1 μm, obtained from VIAVI Solutions, Santa Rosa, CA.

TABLE 4

| Primer composition Ingredients | wt % |
|---|---|
| UviCure S105ES 7-oxabicyclo[4.1.0]hept-3-ylmethyl 7-oxabicyclo[4.1.0]heptane-3-carboxylate (Lambson) [CAS No 2386-87-0] | 46.05 |
| VINNOL ® H14/36 (Wacker Polymer Systems GmbH & Co. KG) (CAS No not available) | 6.2 |
| Diethylene glycol divinyl ether (BASF) [CAS No 764-99-8] | 18.8 |
| EBECRYL ® 2959 (epoxy acrylate oligomer) (Allnex) (CAS No not available) | 3.8 |
| MIRAMER M4004 pentaerythritol $(EO)_n$ tetraacrylate (Rahn) [CAS No 51728-26-8] | 3.8 |
| TEGO ® Airex 900 anti-foaming agent (Evonik) [CAS No 67762-90-7] | 0.2 |
| GENORAD* 16 polymerization inhibitor (Rahn) (CAS No not available) | 0.5 |
| AEROSIL ® R972 fumed silica post-treated with dimethyldichlorosilane (Evonik) [CAS No 68 911-44-9] | 1.9 |
| ACEMATT ® OK 607 high performance silica (Evonik) [CAS No 11 2926-008-8] | 5.4 |
| SilForce* UV9388C bis(4-tert-butylphenyl)iodonium hexafluorophosphate (Momentive) [CAS No 61358-25-6] | 1.7 |
| Omnirad 1173-hydroxy-2-methylpropiophenone (IGM) [CAS No 7473-98-5] | 2.3 |
| SpeedCure CPTX 1-Chloro-4-propoxythioxanthone (Lambson) [CAS No 142770-42-1] | 0.15 |
| Ethyl 3-ethoxypropionate [CAS No 763-69-9] | 1.6 |
| Terathane 1000 (Invista) [CAS No 25190-06-1] | 5.7 |
| Butanol [CAS No 71-36-3] | 1.9 |
| Viscosity/Pas | 0.4 |

Preparation of the Compositions

The UV-Vis curable screen printing compositions were independently prepared by mixing the ingredients listed in Tables 1-3 for 10 minutes at 2000 rpm using Dispermat CV-3.

The top coating inkjet printing compositions were independently prepared by mixing the ingredients listed in Tables 2-3 for 10 minutes at room temperature and at 1000 rpm using a Dispermat (LC220-12).

The viscosities of the compositions were independently measured at 25° C. on a Brookfield viscometer (model "DV-I Prime", spindle S27 at 100 rpm for UV-Vis curable screen printing compositions, and S00 at 50 rpm for top coating inkjet printing compositions) and are provided in Tables 1-4.

Methods of Preparation of the Optical Effect Layers (OELs)

Optical effect layers (OELs) have been prepared according to methods of the invention (E1-E21) and according to comparative methods (C1-C11). Tables 5A-C provide summaries of i) the combination of compositions used during the printing methods, ii) the figure schematically illustrating the method itself, iii) the substrate onto which the UV-Vis curable screen printing composition was applied and iv) the number of passes on the magnetic-field generating device during the magnetic bi-axial orientation.

TABLE 5A

| | Printing inks described in Table | Method described in Fig. | Sub-strate | Number of passes on top of the magnetic-field generating device for bis-axial orientation |
|---|---|---|---|---|
| E1 | 1A | 2B | No 1 | 3 |
| E2 | 1B | 2B | No 1 | 3 |
| E3 | 1A | 2B | No 1 | 12 |
| E4 | 1A | 2B | No 1 | 3 |
| E5 | 1A | 2C | No 1 | 3 (B1) |
| E6 | 1A | 2A | No 1 | 0 (only mono-axial orientation) |
| C1 | 1A | 4A | No 1 | 0 (no magnet) |
| C2 | 1A | 4B | No 1 | 3 |
| C3 | 1A | 4C | No 1 | 3 |
| C4 | 1A | 4D | No 1 | 3 |
| C5 | 1A | 4E | No 1 | 0 (only mono-axial orientation) |
| C11 | 1C | 4F | No 1 | 0 (only mono-axial orientation) |

TABLE 5B

| | Printing inks described in Table | Method described in Fig. | Substrate | Number of passes on top of the magnetic-field generating device |
|---|---|---|---|---|
| E7 | 2 | 2B | No 1 | 3 |
| E8 | 2 | 2B | No 1 | 12 |
| E9 | 2 | 2B | No 1 | 3 |
| E10 | 2 | 2C | No 1 | 3 (B1) |
| E11 | 2 | 2A | No 1 | 0 (only mono-axial orientation) |
| E17 | 2 | 2B | No 3 | 3 |
| E19 | 2 | 2B | No 1 | 3 |

TABLE 5B-continued

| | Printing inks described in Table | Method described in Fig. | Substrate | Number of passes on top of the magnetic-field generating device |
|---|---|---|---|---|
| E20 | 2 | 2C | No 1 | 3 (B1) |
| E21 | 2 | 2A | No 1 | 0 (only mono-axial orientation) |
| C6 | 2 | 4A | No 1 | 0 (no magnet) |
| C7 | 2 | 4B | No 1 | 3 |
| C8 | 2 | 4C | No 1 | 3 |
| C9 | 2 | 4D | No 1 | 3 |
| C10 | 2 | 4E | No 1 | 0 (only mono-axial orientation) |

TABLE 5C

| | Printing inks described in Table | Method described in Fig. | Substrate | Number of passes on top of the magnetic-field generating device |
|---|---|---|---|---|
| E12 | 3 | 2B | No 1 | 3 |
| E13 | 3 | 2B | No 1 | 12 |
| E14 | 3 | 2B | No 1 | 3 |
| E15 | 3 | 2C | No 1 | 3 (B1) |
| E16 | 3 | 2A | No 1 | 0 (only mono-axial orientation) |
| E18 | 3 | 2B | No 2 | 3 |

wherein substrates (x20) No 1-3 were the following ones:
- substrate no 1 is a polymer substrate (Guardian™ from CCL Secure),
- substrate no 2 is a fiduciary paper (Louisenthal BNP paper 100 g/m$^2$),
- substrate no 3 is a fiduciary paper (Louisenthal BNP paper 100 g/m$^2$) coated by hand screen printing using a T90 screen with a primer composition disclosed in Table 4 (primer thickness 20 μm) that was cured by UV-irradiation (two lamps: iron-doped mercury lamp 200 W/cm2+mercury lamp 200 W/cm$^2$ from IST Metz GmbH; 2 passes 100 m/min).

In FIG. 2A (method according to the invention), the method comprised the following steps:
- the step a) (not shown in the Fig.) of screen printing of the UV-Vis curable screen printing composition on the substrate (220) so as to form the coating layer (210),
- subsequently to the step a), the step b) of mono-axially orient at least a part of the magnetic or magnetisable pigment particles,
- subsequently to the step b), the step c) of inkjet printing the top coating inkjet printing composition so as to form the indicium (230), and
- subsequently to the step c), the step d) of curing the coating layer (210) and the indicium (230) with the curing unit (250) so as to form the optical effect layer.

For all examples made according to the methods according to the invention (E6, E11, E16 and 21) about 1.2 seconds occurred between step b) and step c). For examples made according to the method according to the invention (E6, E11, E16 and 21), less than 10 seconds occurred between step c) and step d).

In FIG. 2B (method according to the invention), the method comprised the following steps:
- the step a) (not shown in the Fig.) of screen printing of the UV-Vis curable screen printing composition on the substrate (220) so as to form the coating layer (210),
- subsequently to the step a), the step b) of bi-axially orient at least a part of the magnetic or magnetisable pigment particles,
- subsequently to the step b), the step c) of inkjet printing the top coating inkjet printing composition so as to form the indicium (230), and
- subsequently to the step c), the step d) of curing the coating layer (210) and the indicium (230) with the curing unit (250) so as to form the optical effect layer.

For all examples made according to the methods according to the invention (E1-E4, E7-E9, E12-E14, E17-18, E19), about 1.2 seconds occurred between step b) and step c). Five minutes occurred between step c) and step d) for examples E4, E9 and E14. In all other examples E1-E3, E7-8, E12-13, E17-18 and E19, said period was less than 10 seconds.

In FIG. 2C (method according to the invention), the method comprised the following steps:
- the step a) (not shown in the Fig.) of screen printing of the UV-Vis curable screen printing composition on the substrate (220) so as to form the coating layer (210),
- subsequently to the step a), the step b) consisting of two steps, wherein the first step b1) consisted of bis-axially orienting at least a part of the magnetic or magnetisable pigment particles and the subsequent step b2) of mono-axially re-orienting at least a part of the magnetic or magnetisable pigment particles, subsequently to the step b), the step c) of inkjet printing the top coating inkjet printing composition so as to form the indicium (230), and
- subsequently to the step c), the step d) of curing the coating layer (210) and the indicium (230) with the curing unit (250) so as to form the optical effect layer.

For all examples made according to the methods according to the invention (E5, E10, E15 and E20)), about 1.2 seconds occurred between step b2) and step c). For examples made according to the method according to the invention E5, E10, E15 and E20, about 1.2 seconds occurred between step c) and step d).

Figure 4A:
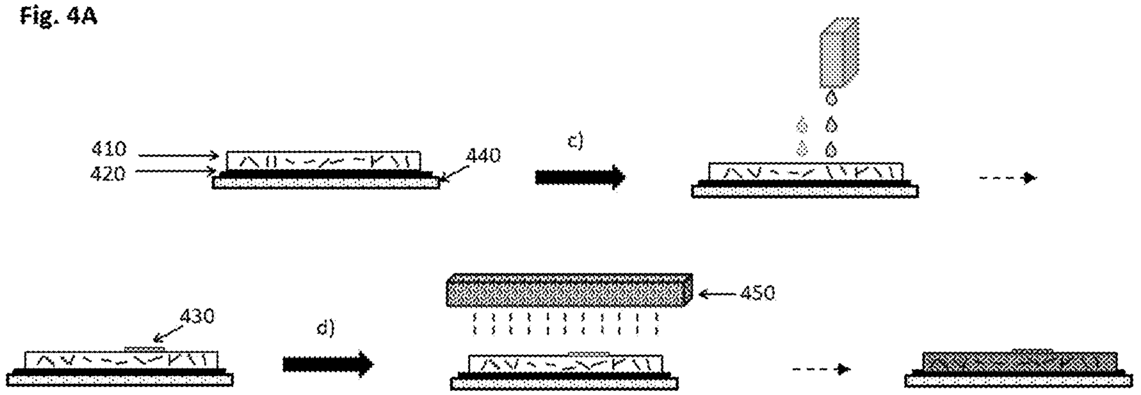
FIG. 4A-F schematically illustrate comparative methods for producing an optical effect layer (OEL) on a substrate (420).

In FIG. 4A (comparative method), the method comprised the following steps:
- the step a) (not shown in the Fig.) of screen printing of the UV-Vis curable screen printing composition on the substrate (420) so as to form the coating layer (410),
- subsequently to the step a), the step c) of inkjet printing the top coating inkjet printing composition so as to form the indicium (430), and
- subsequently to the step c), the step d) of curing the coating layer (410) and the indicium (430) with the curing unit (450) so as to form the optical effect layer.

For all examples made according to this comparative method (C1 and C6), about 1.2 seconds occurred between step c) and step d).

Figure 4B:
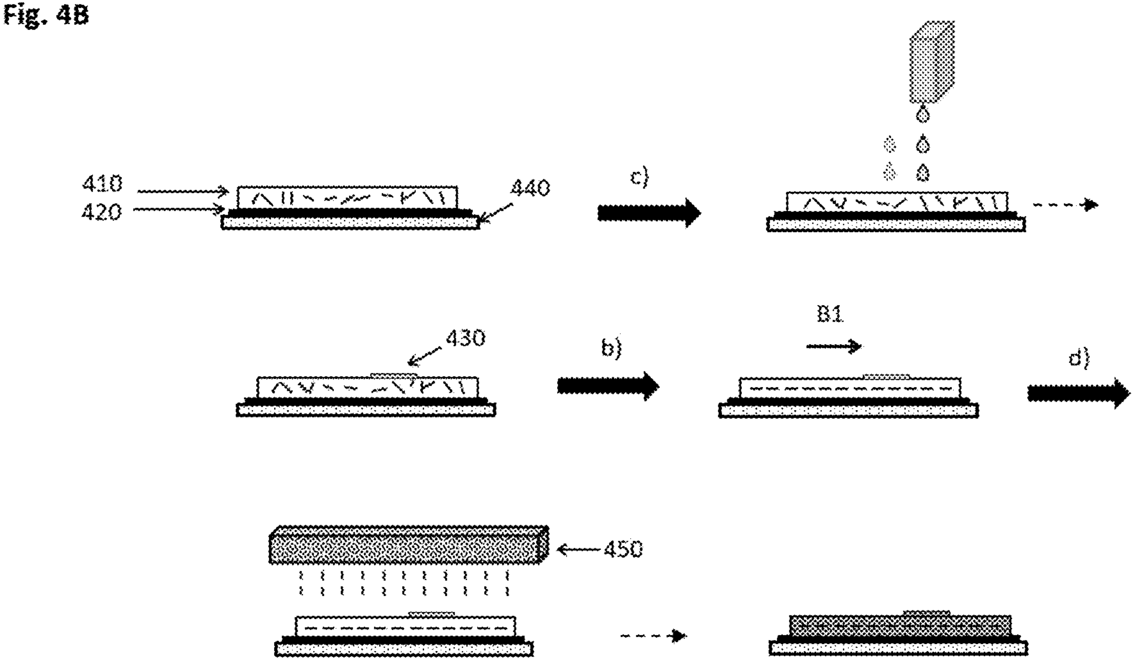

FIG. 4B (comparative method), the method comprised the following steps:
- the step a) (not shown in the Fig.) of screen printing of the UV-Vis curable screen printing composition on the substrate (420) so as to form the coating layer (410),
- subsequently to the step a), the step c) of inkjet printing the top coating inkjet printing composition so as to form the indicium (430),
- subsequently to the step c), the step b) of bi-axially orient at least a part of the magnetic or magnetisable pigment particles, and subsequently to the step c), the step d) of curing the coating layer (410) and the indicium (430) so as to form the optical effect layer.

For all examples made according to this comparative method (C2 and C7), about 10 seconds occurred between step c) and step b) and about 2.4 seconds occurred between step b) and step d).

Figure 4C:
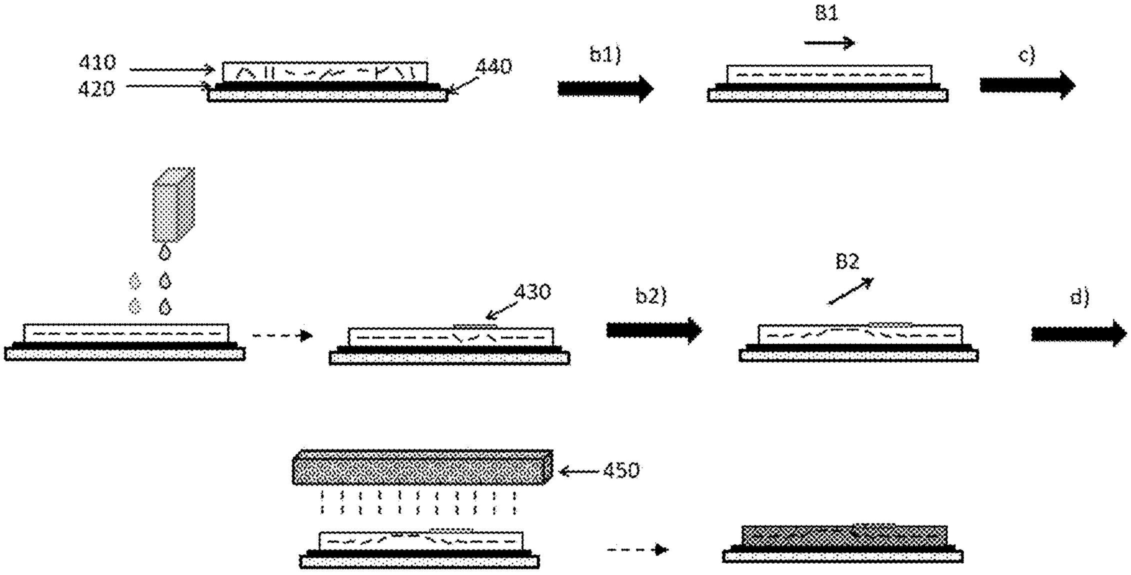

FIG. 4C (comparative method), the method comprised the following steps:

the step a) (not shown in the Fig.) of screen printing of the UV-Vis curable screen printing composition on the substrate (420) so as to form the coating layer (410), subsequently to the step a), the step b)/b1) of bis-axially orient at least a part of the magnetic or magnetisable pigment particles, subsequently to the step/b1), the step c) of inkjet printing the top coating inkjet printing composition so as to form the indicium (430), subsequently to the step c), the step b2) of mono-axially re-orienting at least a part of the magnetic or magnetisable pigment particles, and subsequently to the step b2), the step d) of curing the coating layer (410) and the indicium (430) with the curing unit (450) so as to form the optical effect layer.

For all examples made according to this comparative method (C3 and C8), about 0.3 seconds occurred between step b1) and step c), about 1.2 seconds occurred between step c) and step b2) and about 3.2 seconds occurred between step b2) and step d).

Figure 4D:
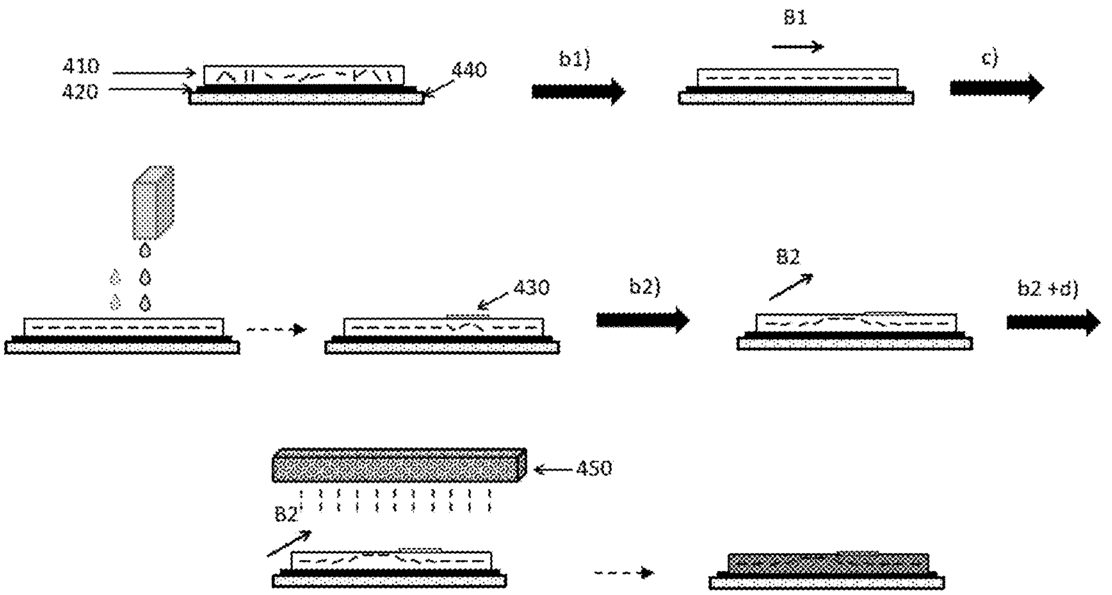

FIG. 4D (comparative method), the method comprised the following steps:

the step a) (not shown in the Fig.) of screen printing of the UV-Vis curable screen printing composition on the substrate (420) so as to form the coating layer (410), subsequently to the step a), the step b1) of bis-axially orienting at least a part of the magnetic or magnetisable pigment particles and, subsequently to the step b)/b1), the step c) of inkjet printing the top coating inkjet printing composition so as to form the indicium (430), subsequently to the step c), the step b2) of mono-axially re-orienting at least a part of the magnetic or magnetisable pigment particles, and partially simultaneously with the step b)/b2), the step d) of curing the coating layer (410) and the indicium (430) with the curing unit (450) so as to form the optical effect layer.

For all examples made according to this comparative method (C4 and C9), about 0.3 seconds occurred between step b1) and step c) and about 1.2 seconds occurred between step c) and b2).

Figure 4E:
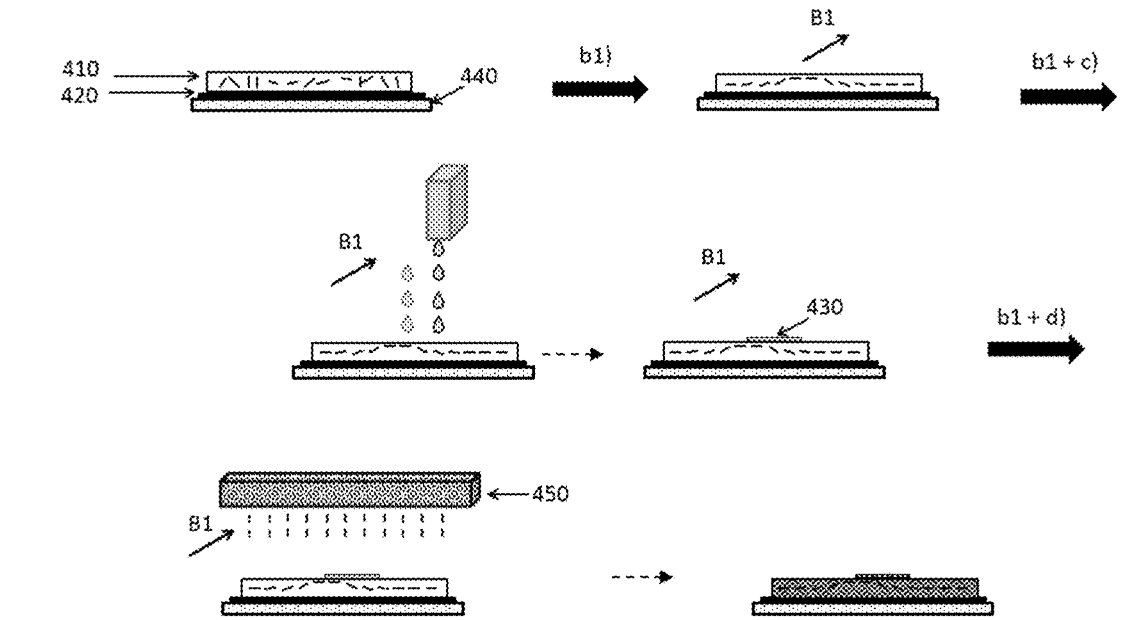

FIG. 4E (comparative method), the method comprised the following steps:

the step a) (not shown in the Fig.) of screen printing of the UV-Vis curable screen printing composition on the substrate (420) so as to form the coating layer (410), subsequently to the step a), the step b) of mono-axially orienting at least a part of the magnetic or magnetisable pigment particles, partially simultaneously with the step b) (i.e. while keeping the substrate (420) in the magnetic field (B1) of the magnetic-field-generating device), the step c) of inkjet printing top coating inkjet printing composition so as to form the indicium (430), partially simultaneously with the steps b), (i.e. that is while keeping the substrate (420) in the magnetic field (B1) of the magnetic-field-generating device) but subsequently to the step c), the step d) of curing the coating layer (410) and the indicium (430) with the curing unit (450) so as to form the optical effect layer.

For all examples made according to this comparative method (C5 and C10), about 2.2 seconds occurred between step c) and step d).

Figure 4F:
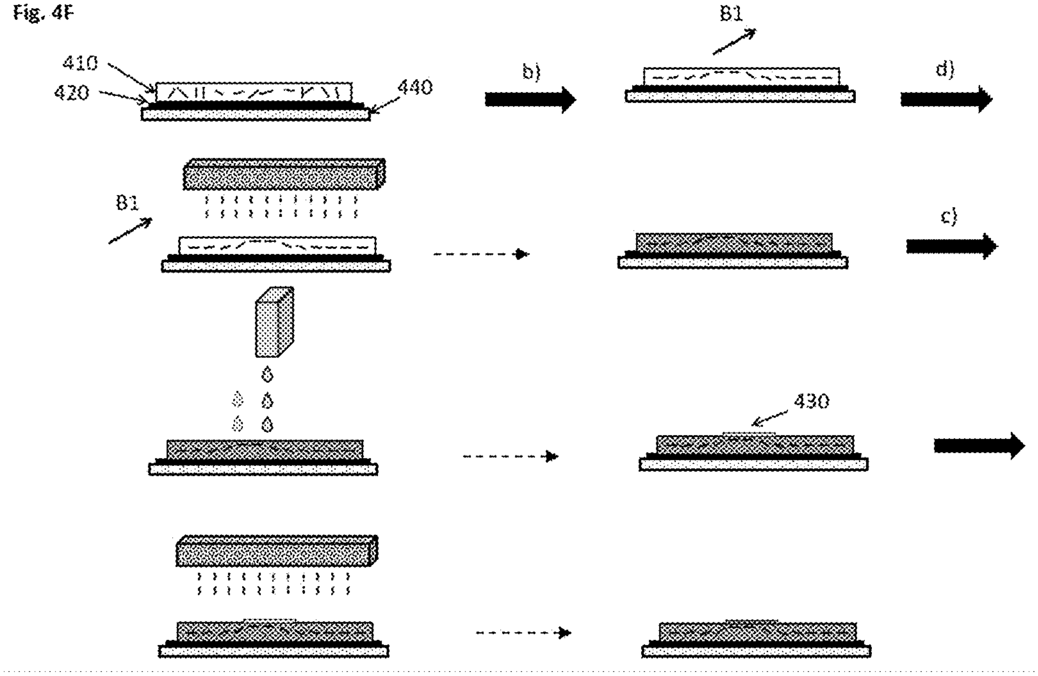

FIG. 4F (comparative method), the method comprised the following steps:

the step (not shown in the Fig.) of screen printing of the UV-Vis curable screen printing composition on the substrate (420) so as to form the coating layer (410), subsequently to said step, the step b) of mono-axially orienting at least a part of the magnetic or magnetisable pigment particles, partially simultaneously with the step b) (i.e. while keeping the substrate (420) in the magnetic field (B1) of the magnetic-field-generating device), the step d) of curing the coating layer (410) with the curing unit, subsequently to said step d), the step c) of inkjet printing the top coating inkjet printing composition so as to form the indicium (430), subsequently to said step c), the step of curing the indicium (430) with the curing unit.

For the example made according to this comparative method (C11), about 5 seconds occurred between the last two steps.

Screen Printing of the UV-Vis Curable Screen Printing Compositions

The UV-Vis curable screen printing compositions described in Tables 1-3 were independently applied by hand screen printing using a T90 screen on the substrate (x20) (70 mm×70 mm) described in Tables 5 so as to form a coating layer (x10) having the following dimensions: 25 mm×25 mm and a thickness of about 20 μm.

Magnetic Orientation of the UV-Vis Curable Screen Printing Compositions

Subsequently to the screen printing step described herein, the step of exposing the coating layer (x10) to the magnetic field of the magnetic-field generating device described hereafter was carried out to orient at least a part of the magnetic or magnetisable pigment particles.

Magnetic-Field Generating Device for Bi-Axial Orientation (Shown in FIG. 3)

The magnetic-field generating device used to bi-axially orient at least a part of the magnetic or magnetisable pigment particles comprised a) a first set (S1) comprising a first bar dipole magnets (371) and two second bar dipole magnets (372$_a$ and 372$_b$) and a second set (S2) comprising a first bar dipole magnets (371) and two second bar dipole magnets (372$_a$ and 372$_b$) and b) a pair (P1) of third bar dipole magnets (373$_a$ and 373$_b$).

The upmost surface of the first bar dipole magnets (371) of the first and second sets (S1, S2), of the second bar dipole magnets (372$_a$ and 372$_b$) of the first and second sets (S1, S2) and of the third bar dipole magnets (373$_a$ and 373$_b$) of the pair (P1) were flush with each other.

The third bar dipole magnet (373$_a$) was aligned with the second bar dipole magnet (372$_a$) of the first set (S1) and with the second bar dipole magnet (372$_a$) of the second set (S2) so as form a line. The third bar dipole magnet (373$_b$) was aligned with the second bar dipole magnet (372$_b$) of the first set (S1) and with the second bar dipole magnet (372$_b$) of the second set (S2) so as form a line.

The first bar dipole magnets (371) of the first and second sets (S1, S2) had the following dimensions: first thickness (L1) of 5 mm, first length (L4) of 60 mm and first width (L5) of 40 mm. Each of the second bar dipole magnets (372$_a$ and $372_b$) of the first and second sets (S1, S2) had the following dimensions: second thickness (L2) of 10 mm, second length (L6) of 40 mm and second width (L7) of 10 mm. Each of the third bar dipole magnets ($373_a$ and $373_b$) of the pair (P1) had the following dimensions: third thickness (L3) of 10 mm, third length (L8) of 20 mm and third width (L9) of 10 mm.

The first bar dipole magnet (371) of the first set (S1) and the second bar dipole magnets ($372_a$ and $372_b$) of the first set (S1) were aligned to form a column and the first bar dipole magnet (371) of the second set (S2) and the second bar dipole magnets ($372_a$ and $372_b$) of the second set (S2) were aligned to form a column. For each set (S1, S2) and each column described herein, the first bar dipole magnets (371) and the two second bar dipole magnets ($372_a$ and $372_b$) were spaced apart by a second distance (d2) of 2 mm. For each line described herein, the third bar dipole magnets ($373_a$ and $373_b$) and the two second bar dipole magnets ($372_a$) were spaced apart by a third distance (d3) of 2 mm.

The first bar dipole magnets (371) of the first and second sets (S1, S2) had their magnetic axis oriented to be substantially parallel to the substrate (320), wherein the first bar dipole magnet (371) of the first set (S1) had its magnetic direction opposite to the magnetic direction of the first bar dipole magnet (371) of the second set (S2) and were spaced apart by a first distance (d1) of 24 mm (corresponding to the sum of the third length (L8) and the two third distances (d3)).

The two second bar dipole magnets ($372_a$ and $372_b$) of the first and second sets (S1, S2) had their magnetic axis oriented to be substantially perpendicular to the first plane and substantially perpendicular to the substrate (320). The South pole of the second bar dipole magnet ($372_a$) of the first set (S1) pointed towards the first plan and towards the substrate (320), the North pole of the second bar dipole magnet ($372_b$) of the first set (S1) pointed towards the substrate (320), the North pole of the first bar dipole magnets (371) of the first set (S1) pointed towards the second bar dipole magnet ($372_b$) of the first set (S1). The North pole of the second bar dipole magnet ($372_a$) of the second set (S2) pointed towards the first plan and towards the substrate (320), the South pole of the second bar dipole magnet ($372_b$) of the second set (S2) towards the substrate (320), the North pole of the first bar dipole magnets (371) of the second set (S2) pointed towards the second bar dipole magnet ($372_a$) of the second set (S2).

The South pole of the third bar dipole magnet ($373_a$) pointed towards the second bar dipole magnet ($372_a$) of the first set (S1), said second bar dipole magnet ($372_a$) having its South pole pointing towards the substrate (320); and the North pole of the third bar dipole magnet ($373_b$) pointed towards the second bar dipole magnet ($372_b$) of the first set (S1), said second bar dipole magnet ($372_b$) having its North pole pointing towards the substrate (320).

The first bar dipole magnets (371) of the first and second sets (S1, S2), the second bar dipole magnets ($372_a$ and $372_b$) of the first and second sets (S1, S2) and the third bar dipole magnets ($373_a$ and $373_b$) of the pair (P1) were made of NdFeB N42 And were embedded in a non-magnetic supporting matrix (not shown) made of polyoxymethylene (POM) having the following dimensions: 115 mm×115 mm×12 mm.

During the magnetic orientation, the substrate (320) carrying the coating layer (310) was disposed on a non-magnetic supporting plate made of POM described hereabove with the coating layer (310) facing the environment so as to form an assembly, wherein said non-magnetic supporting plate (340) had the following dimensions: 180 mm×130 mm×2 mm and comprised a centrally aligned aperture (48 mm×48 mm), with the coating layer (310) facing the magnetic-field generating device (300). The assembly was moved back and forth as described in Tables 5 in the vicinity and on top of the magnetic-field-generating device (300) at a distance of about 2 mm from the top surface of said device Magnetic-Field Generating Device for Mono-Axial Orientation The magnetic-field generating device used to mono-axially orient at least a part of the magnetic or magnetisable pigment particles comprised a bar dipole magnet having a length of about 30 mm, a width of about 24 mm and a thickness of about 6 mm, wherein said bar dipole magnet was embedded in a matrix made of POM and having the following dimensions: 40 mm×40 mm×15 mm. The North-South magnetic axis of the bar dipole magnet was parallel to the substrate (x20) surface and parallel to the width. The bar dipole magnet was made of NdFeB N42.

During the magnetic orientation, the substrate (x20) carrying the coating layer (x10) was disposed on the non-magnetic supporting plate made of POM described hereabove with the coating layer (x10) facing the environment so as to form an assembly. The assembly was placed in the vicinity and on top of the magnetic-field-generating device so that the substrate (x20) was at a distance of about 6 mm from the top surface of the bar dipole magnet.

For the methods shown in FIGS. 2A, 2C and 4C (device producing magnetic field B2 in FIGS. 2C and 4C), the magnetic-field-generating device was removed vertically from the surface of the substrate (x20) opposite to the surface carrying the layer (x10) before carrying out the following step.

For the methods shown in FIGS. 4D and 4E (device producing magnetic field B2), the assembly was kept on top of the magnetic-field-generating device during the following steps.

Inkjet Printing of the Top Coating Inkjet Printing Compositions

The top coating inkjet printing compositions described in Tables 1-3 were independently applied by DOD inkjet printing using a Kyocera KJ4A-TA printhead (600 dpi) so as to form indicia having the shape of a rectangle having the following dimensions: 20 mm×12 mm.

For the examples E1-E18 and for the comparative examples C1-C11, the respective top coating compositions were applied at about 4 $g/m^2$.

Figure 5A:
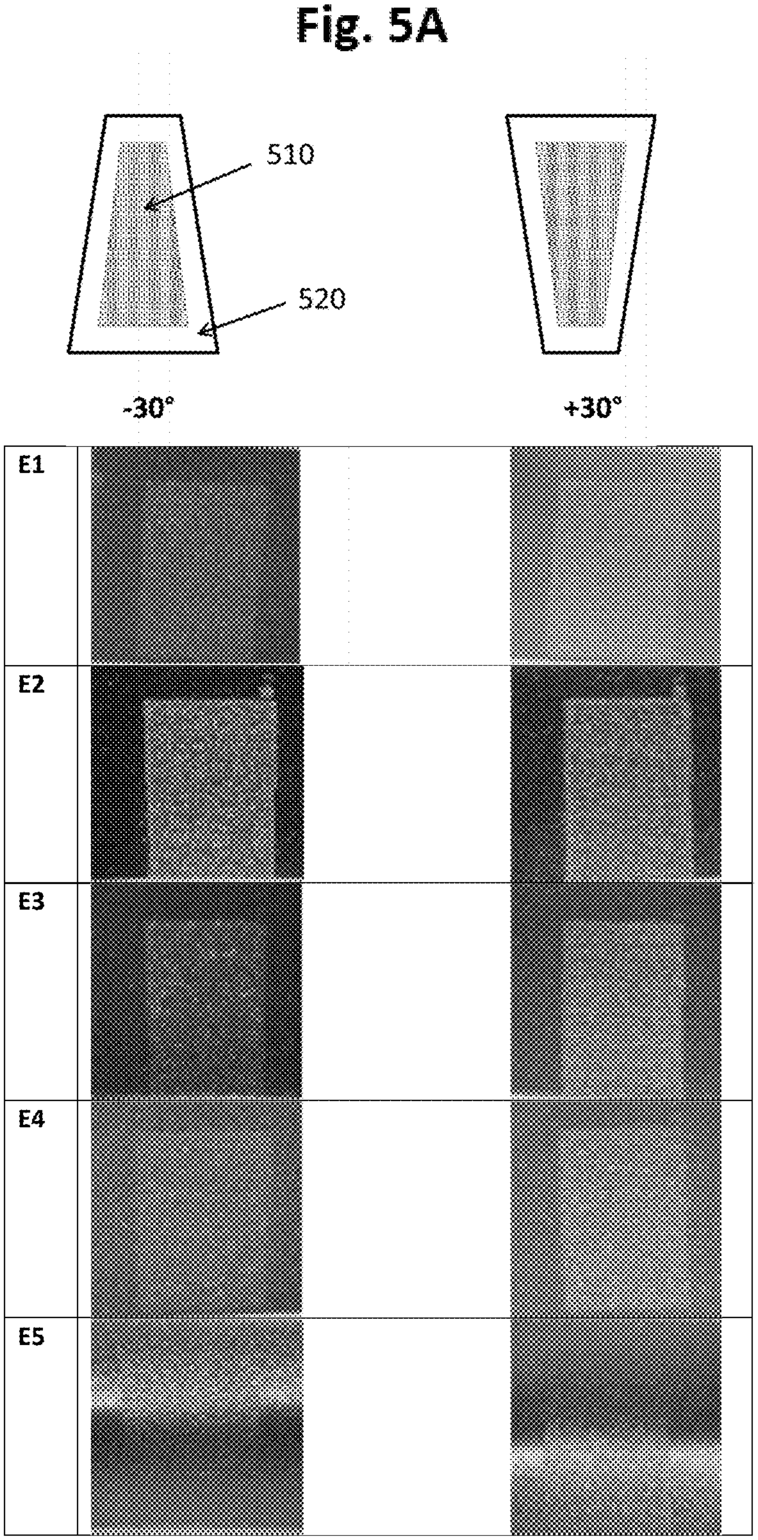
FIG. 5A-E show pictures of OELs prepared with the method according to the present invention (E1-E21) and prepared according to a comparative method (C1-C11) at two viewing angles (−30° and)+30°.
Figure 5A:
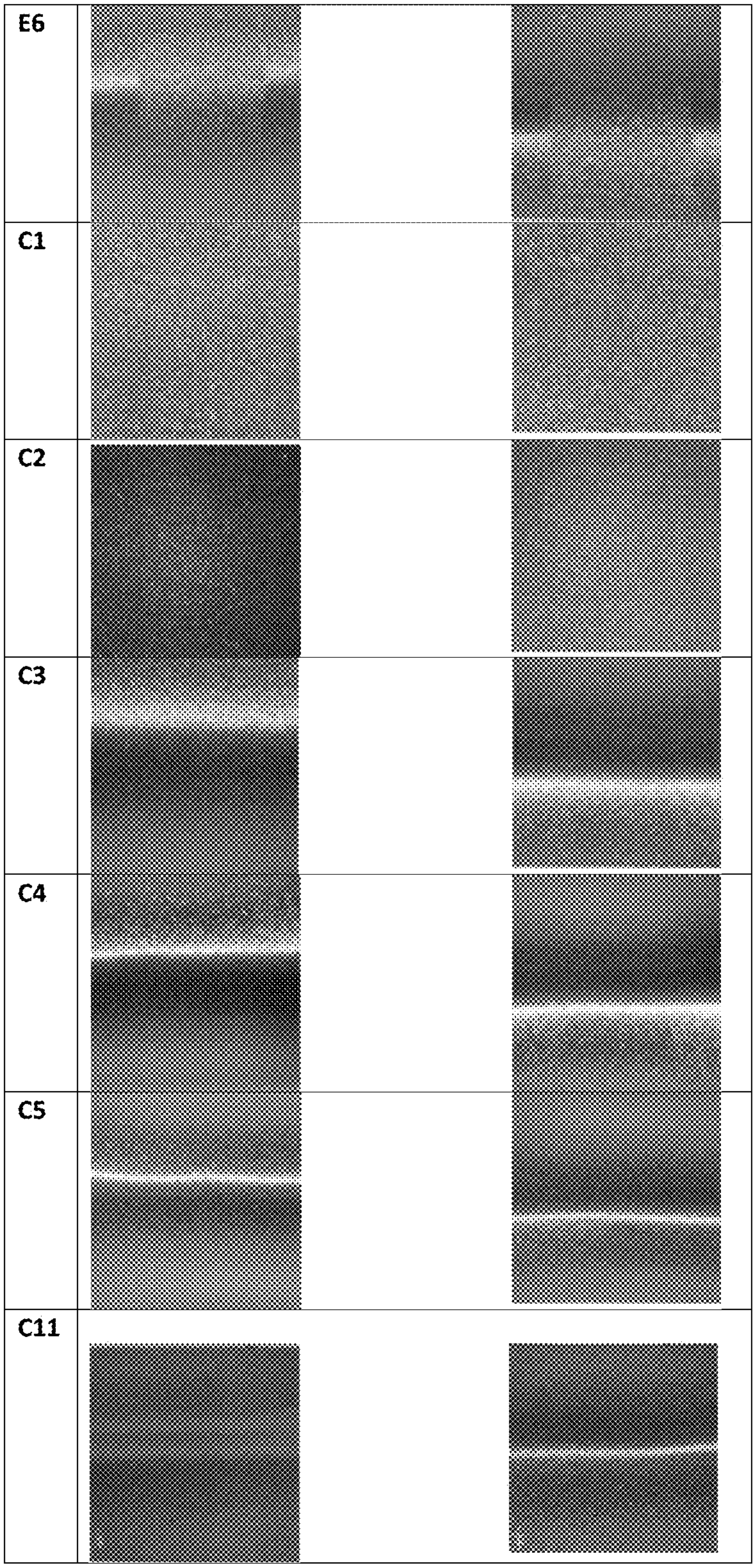
Figure 5B:
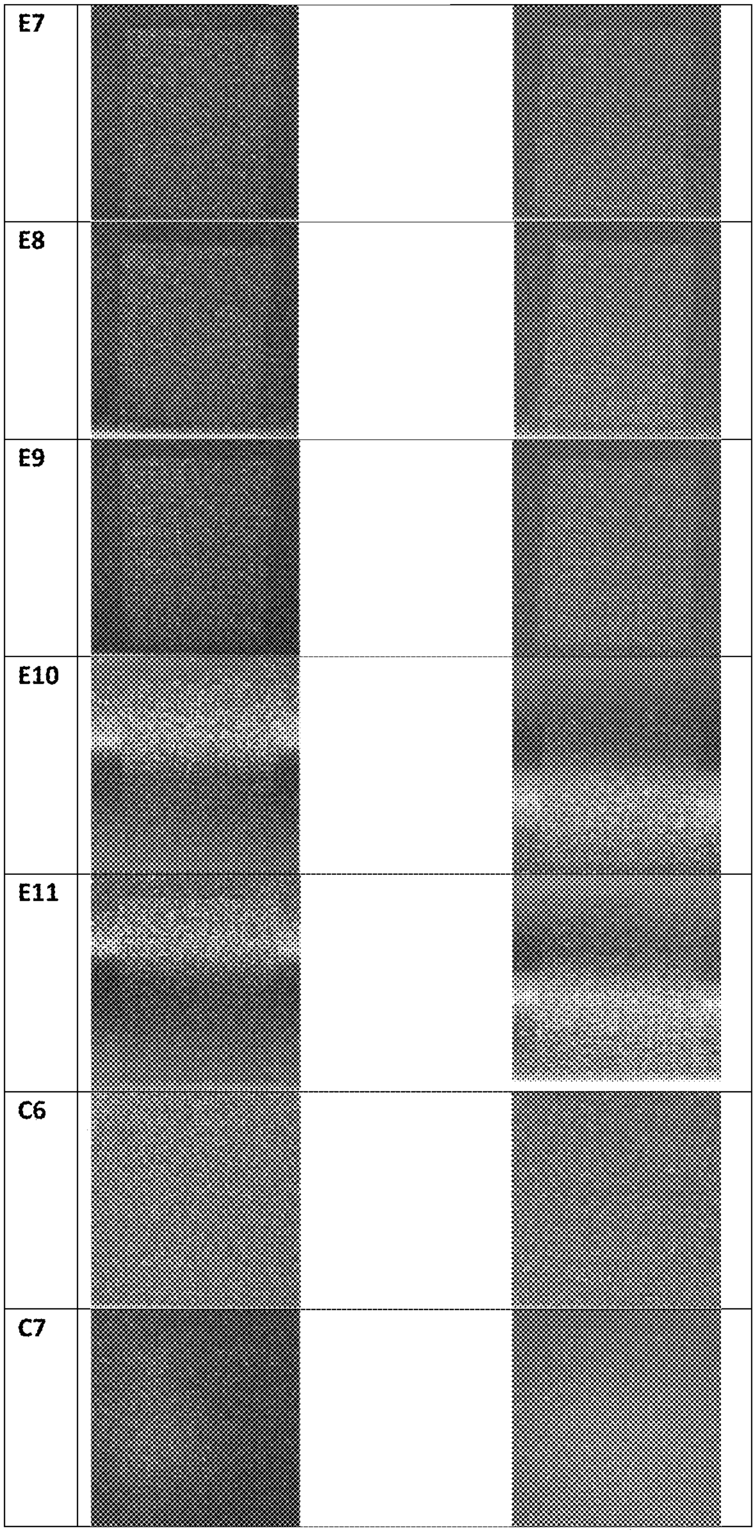
Figure 5B:
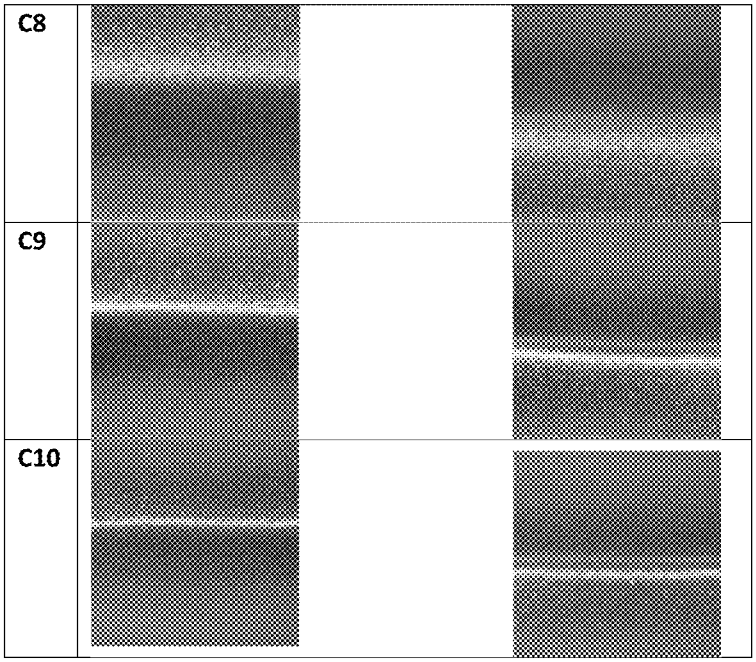
Figure 5C:
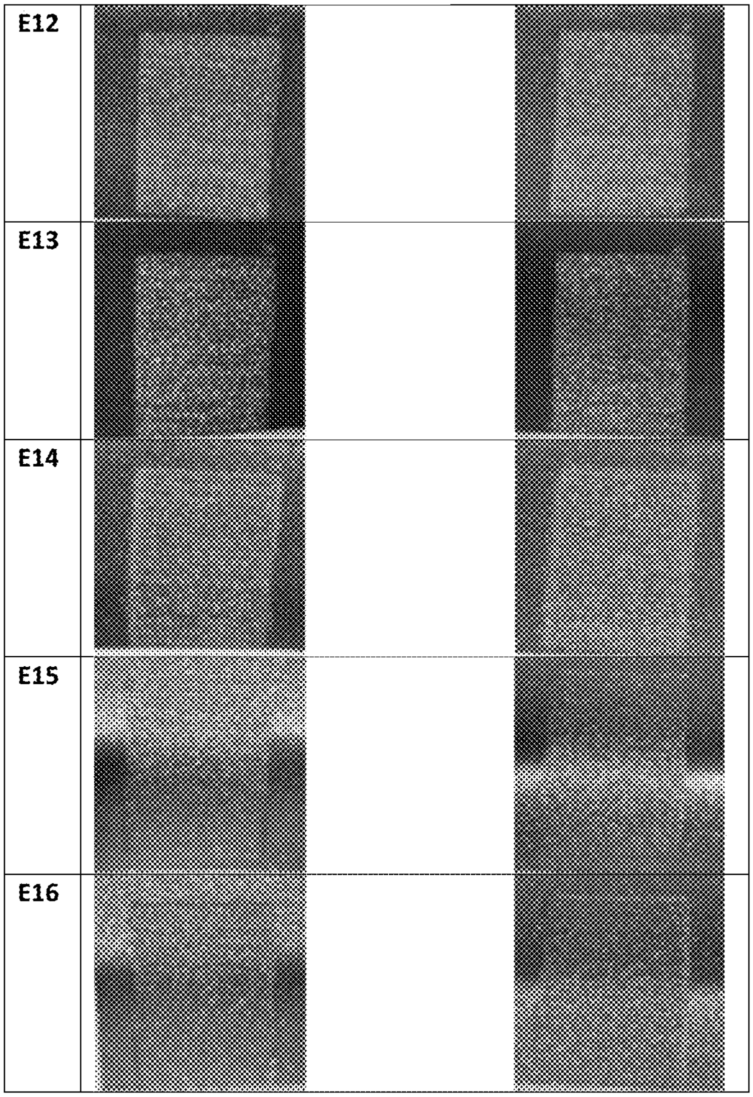
Figure 5D:
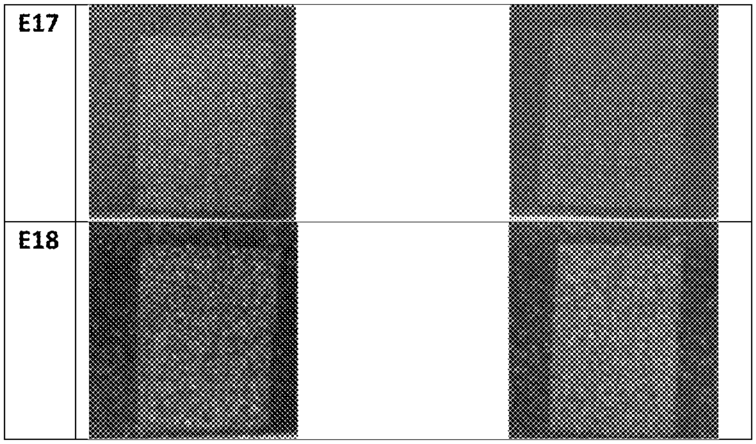
Figure 5E:
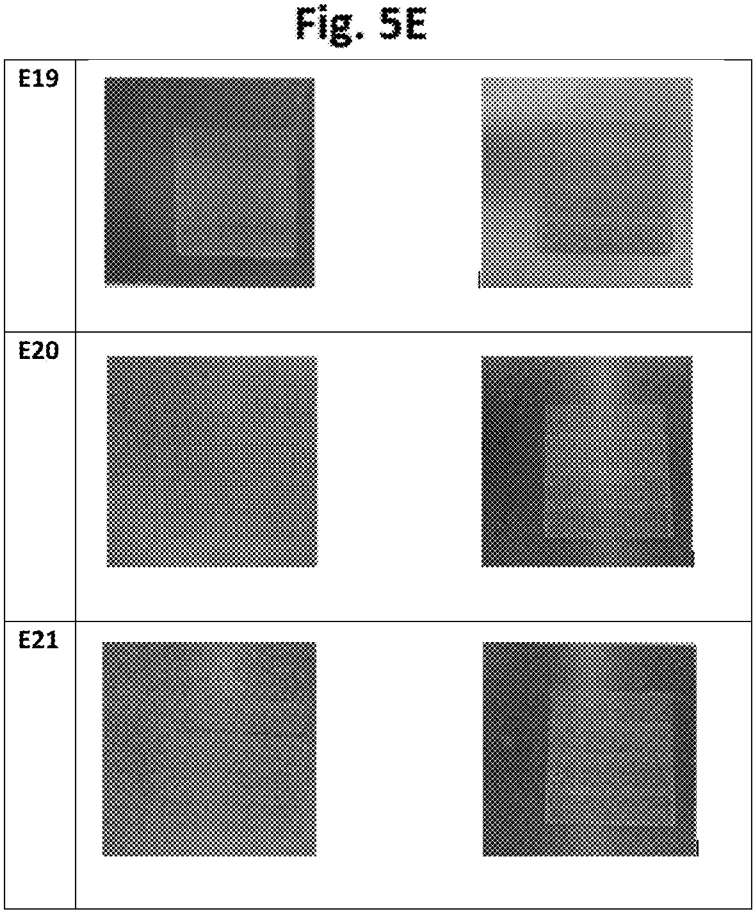

For the examples E19-E21 (halftones inkjet printing of the top coating composition), the top coating composition was applied at about 0.4 $g/m^2$, about 2.0 $g/m^2$, about 4.1 $g/m^2$ and about 8.1 $g/m^2$, respectively (see pictures in FIG. 5E, rectangles from top to bottom).

Curing the Coating Layer (x10) Made of the UV-Vis Curable Screen Printing Compositions and the Indicia (x30) Made of the Top Coating Inkjet Printing Compositions The coating layers (x10) made of the UV-Vis curable screen printing compositions and the indicia made of the top coating inkjet printing compositions described in Tables 1-3 were cured by exposure to a UV-LED-lamp from Phoseon (Type FireLine 125×20 mm, 395 nm, 8 $W/cm^2$) for about 0.5 second.

The coating layer (x10) made of the UV-Vis curable screen printing composition of the comparative example C11 was cured by exposure to a UV-LED-lamp from Phoseon (Type FireLine 125×20 mm, 395 nm, 8 $W/cm^2$) for about 0.5 second and the indicium made of the top coating inkjet printing composition of C11 was cured by exposure to a curing unit for about 0.7 second (two lamps: iron-doped mercury lamp 200 $W/cm^2$+mercury lamp 200 $W/cm^2$ from IST Metz GmbH).

Pictures of the optical effect layers obtained by the methods according to the invention and by the comparative methods are provided in FIG. 5A-E (FIG. 5A corresponding to the examples of Table 5A; FIG. 5B corresponding to the examples of Table 5B and FIG. 5C corresponding to the examples of Table 5C; FIG. 5D corresponding to the example E17 of Table 5B and E18 of Table 5C; FIG. 5E corresponding to examples E19-E21 of Table 5B with the top coating being printed in halftones) at two different viewing angles (−30° left; +30° right).

The comparative method shown in FIG. 4A for preparing the examples (C1 and C6) and lacking a step of magnetically orienting at least a part of the magnetic or magnetisable pigment particles provided optical effect layers having randomly oriented particles without exhibiting the one or more indicia. The optical effect layers obtained by a method lacking a step exposing the coating layer (x10) to the magnetic field of the magnetic-field generating device so as to orient at least a part of particles prior to the step of applying the top coating composition on top of the coating layer (x10) in the form of one or more indicia (x30), do not exhibit the one or more indicia.

The comparative method shown in FIG. 4B for preparing the examples (C2 and C7), wherein the inkjet printing step was followed by the step of magnetically orienting at least a part of the magnetic or magnetisable pigment particles (i.e. a method lacking the step of at least partially curing subsequently to the inkjet printing step) provided optical effect layers having bi-axially oriented particles having both their X-axes and Y-axes substantially parallel to the substrate surface without exhibiting the indicia. The optical effect layers obtained by a method wherein the step exposing the coating layer (x10) to the magnetic field of the magnetic-field generating device so as to orient at least a part of particles is carried out subsequently to the step of applying the top coating composition on top of the coating layer (x10) in the form of one or more indicia (x30) without an intermediate step of at least partially curing the top coating composition do not exhibit the one or more indicia.

The comparative methods shown in FIGS. 4C and 4D for preparing the examples (C3, C4, C8 and C9), wherein the step of magnetically bi-axially orienting at least a part of the magnetic or magnetisable pigment particles was carried out prior to the inkjet printing step which was then followed by the step of magnetically mono-axially re-orienting the particles (i.e. methods lacking the step of at least partially curing subsequently to the inkjet printing step) provided optical effect layers having bi-axially oriented particles exhibiting a rolling bar upon tilting said OEL without exhibiting the indicia. The optical effect layers obtained by a method wherein the step of exposing the coating layer (x10) to the magnetic field of the magnetic-field generating device so as to orient at least a part of particles subsequently to the step of applying the top coating composition on top of the coating layer (x10) in the form of one or more indicia (x30) without an intermediate step of at least partially curing is not carried out subsequently to the step of applying the top coating composition do not exhibit the one or more indicia.

The comparative method shown in FIG. 4E for preparing the examples (C5 and C10), wherein the step of magnetically mono-axially orienting at least a part of the magnetic or magnetisable pigment particles was carried simultaneously with the inkjet printing step and simultaneously with the step of at least partially curing (i.e. a method lacking the step of at least partially curing subsequently to the inkjet printing step or a method comprising the step of orienting at least a part of the magnetic or magnetisable pigment particles being carried out simultaneously or subsequently to the inkjet printing step) provided optical effect layers having mono-axially oriented particles exhibiting a rolling bar upon tilting said OEL without exhibiting the indicia. The optical effect layers obtained by a method wherein the step exposing the coating layer (x10) to the magnetic field of the magnetic-field generating device so as to orient at least a part of particles is carried out partially simultaneously with the step of applying the top coating composition on top of the coating layer (x10) in the form of one or more indicia (x30) and simultaneously with the step of at least partially curing do not exhibit the one or more indicia.

The comparative method shown in FIG. 4F for preparing the example C11 wherein the magnetic or magnetisable pigment particles are oriented and fixed by curing prior to the inkjet printing step led to an optical effect layer exhibiting a rolling bar upon tilting said OEL without exhibiting the one or more indicia.

Contrary to the examples (C1-C11) prepared according to the comparative methods shown in FIG. 4A-4F, the examples (E1-E18) prepared according to the methods according to the invention shown in FIG. 2A-2C exhibited not only an eye-catching effect but also exhibiting the one or more indicia described herein.

The method according the invention shown in FIG. 2B for preparing the examples (E1-E4, E7-E9, E12-E14 and E17-18), wherein the step of magnetically bi-axially orienting at least a part of the magnetic or magnetisable pigment particles was carried prior to the inkjet printing step which was then followed by the step of at least partially curing the coating layer (x10) and the one or more indicia (x30) provided optical effect layers having bi-axially oriented particles having both their X-axes and Y-axes substantially parallel to the substrate (x20) surface and exhibiting the indicia and thus provided optical effect layers with bright and highly reflective areas as well as the indicia.

The method according the invention shown in FIG. 2C for preparing the examples (E5, E10 and E15), wherein two magnetic orientation steps were carried out (i.e. the second step of magnetically mono-axially re-orienting at least a part of the magnetic or magnetisable pigment particles was carried subsequently to the first step of magnetically bi-axially orienting at least a part of the particles) prior to the inkjet printing step which was then followed by the step of at least partially curing the coating layer (x10) and the one or more indicia (x30) provided optical effect layers having bi-axially oriented particles exhibiting a rolling bar upon tilting said OEL and exhibiting the indicia and thus provided optical effect layers with bright and highly reflective areas as well as the indicia.

The method according the invention shown in FIG. 2A for preparing the examples (E6, E11 and E16), wherein the step of magnetically mono-axially orienting at least a part of the magnetic or magnetisable pigment particles was carried out prior to the inkjet printing step which was then followed by the step of at least partially curing the coating layer (x10) and the one or more indicia (x30) provided optical effect layers having mono-axially oriented particles exhibiting a rolling bar upon tilting said OEL and exhibiting the indicia.

As shown in FIG. 5A-E, the combinations of UV-Vis curable screen printing compositions comprising the magnetic or magnetisable pigment particles, said compositions, which may be cationically curable, radically curable or hybrid curable compositions, for producing the coating layer (x10) with the top coating inkjet printing compositions for producing the one or more indicia with the method according to the present invention allowed the preparation of optical effect layers exhibiting one or more indicia, wherein said OELs may be produced on different types of substrates.

The invention claimed is:

1. A method for producing an optical effect layer exhibiting one or more indicia on a substrate comprising the steps of:

a) applying on a substrate surface a radiation curable coating composition comprising non-spherical magnetic or magnetizable pigment particles, said radiation curable coating composition being in a first, liquid state so as to form a coating layer;

b) exposing the coating layer to a magnetic field of a magnetic-field generating device so as to orient at least a part of the magnetic or magnetisable pigment particles;

c) subsequently to step b), applying a nonmagnetic top coating composition on top of the coating layer when the radiation curable coating composition of the coating layer is in a wet and unpolymerized state and the magnetic or magnetizable pigment particles are freely movable and rotatable, wherein said top coating composition is applied in the form of one or more indicia, wherein the top coating composition comprises one or more monomers and/or oligomers selected from radically curable compounds, cationically curable compounds and mixtures of radically and cationically curable compounds, wherein the cationically curable compounds are selected from the group consisting of vinyl ethers, propenyl ethers, cyclic ethers, lactones, and mixtures thereof, and the radically curable compounds are (meth)acrylates, and wherein applying the top coating composition on top of the coating layer alters an orientation of the magnetic or magnetisable particles under the top coating composition; and d) partially simultaneously with or subsequently to step c), at least partially curing the coating layer and the one or more indicia with a curing unit.

2. The method according to claim 1, wherein the step b) of exposing the coating layer is carried out so as to mono-axially orient at least a part of the non-spherical magnetic or magnetisable pigment particles.

3. The method according to claim 1, wherein the step b) of exposing the coating layer is carried out so as to bi-axially orient at least a part of the non-spherical magnetic or magnetisable pigment particles, wherein the non-spherical magnetic or magnetisable pigment particles are platelet-shaped magnetic or magnetisable pigment particles, having an X-axis and a Y-axis defining a plane of predominant extension of the particles.

4. The method according claim 3, wherein the step b) exposing the coating layer is carried out so as to bi-axially orient at least a part of the platelet-shaped magnetic or magnetisable pigment particles to have both their X-axes and Y-axes substantially parallel to the substrate surface.

5. The method according to claim 3, wherein step b) consists of two steps, a first step b1) consisting of exposing the coating layer to the magnetic field of the magnetic-field generating device so as to bi-axially orient at least a part of the platelet-shaped magnetic or magnetisable pigment particles, and a further step b2) consisting of exposing the coating layer to a magnetic field of a second magnetic-field-generating device so as to mono-axially orient at least a part of the platelet-shaped magnetic or magnetisable particles, wherein said further step b2) is carried out partially simultaneously with, simultaneously with or subsequently to the step b1).

6. The method according to claim 1 further comprising:

a step x) of selectively at least partially curing one or more first areas of the coating layer to fix at least a part of the magnetic or magnetisable particles in their adopted positions and orientations, such that one or more second areas of the coating layer remain unexposed to irradiation; and a step y) of exposing the coating layer to a magnetic field of the second magnetic-field-generating device, wherein said step x) is carried out partially simultaneously with or subsequently to the step c) and said step y) is carried out after said step x) and partially simultaneously with or prior to the step d).

7. The method according to claim 5 further comprising:

a step x) of selectively at least partially curing one or more first areas of the coating layer to fix at least a part of the magnetic or magnetisable particles in their adopted positions and orientations, such that one or more second areas of the coating layer remain unexposed to irradiation; and a step y) of exposing the coating layer to a magnetic field of a third magnetic-field-generating device, wherein said step x) is carried out partially simultaneously with or subsequently to the step c) and said step y) is carried out after said step x) and partially simultaneously with or prior to the step d).

8. The method according to claim 1 further comprising a step x) of selectively at least partially curing one or more first areas of the coating layer to fix at least a part of the magnetic or magnetisable particles in their adopted positions and orientations, such that one or more second areas of the coating layer remain unexposed to irradiation; and a step y) of exposing the coating layer to a magnetic field of the second magnetic-field-generating device, wherein said step x) is carried out partially simultaneously with or subsequently to the step b) and said step y) is carried out after said step x) and prior to the step c).

9. The method according to claim 5 further comprising a step x) of selectively at least partially curing one or more first areas of the coating layer to fix at least a part of the magnetic or magnetisable particles in their adopted positions and orientations, such that one or more second areas of the coating layer remain unexposed to irradiation; and a step y) of exposing the coating layer to a magnetic field of a third magnetic-field-generating device, wherein said step x) is carried out partially simultaneously with or subsequently to the step b) and said step y) is carried out after said step x) and prior to the step c).

10. The method according to claim 1, wherein the step a) of applying the radiation curable coating composition is carried out by a process selected from the group consisting of screen printing, rotogravure printing, pad printing and flexography printing.

11. The method according to claim 1, wherein the step c) of applying the top coating composition is carried out by a contactless fluid microdispensing technologies.

12. The method according to claim 1, wherein at least a part of the non-spherical magnetic or magnetisable particles is constituted by non-spherical optically variable magnetic or magnetisable pigment particles.

13. The method according to claim 12, wherein the non-spherical optically variable magnetic or magnetisable pigment particles are selected from the group consisting of magnetic thin-film interference pigments, magnetic cholesteric liquid crystal pigments and mixtures thereof.

14. The method according to claim 1, wherein the one or more indicia are selected from the group consisting of codes, symbols, alphanumeric symbols, motifs, geometric patterns, letters, words, numbers, logos, drawings, portraits and combinations thereof.

15. The method according to claim 11, wherein the step c) of applying the top coating composition is carried out by an inkjet printing process.

16. The method according to claim 1, wherein the radically curable compounds are selected from the group consisting of epoxy (meth)acrylates, (meth)acrylated oils, polyester and polyether (meth)acrylates, aliphatic or aromatic urethane (meth)acrylates, silicone (meth)acrylates, acrylic (meth)acrylates and mixtures thereof.

* * * * *